US012100330B2

(12) United States Patent
Moon

(10) Patent No.: US 12,100,330 B2
(45) Date of Patent: Sep. 24, 2024

(54) DISPLAY APPARATUS AND DRIVING METHOD THEREOF

(71) Applicant: LG Display Co., Ltd., Seoul (KR)

(72) Inventor: Kyeong Min Moon, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/500,968

(22) Filed: Nov. 2, 2023

(65) Prior Publication Data

US 2024/0212555 A1 Jun. 27, 2024

(30) Foreign Application Priority Data

Dec. 22, 2022 (KR) ........................ 10-2022-0182234

(51) Int. Cl.
*G09G 3/20* (2006.01)
*G09G 3/3233* (2016.01)

(52) U.S. Cl.
CPC ......... *G09G 3/2007* (2013.01); *G09G 3/3233* (2013.01); *G09G 2300/0819* (2013.01); *G09G 2300/0842* (2013.01); *G09G 2300/0861* (2013.01); *G09G 2310/027* (2013.01); *G09G 2310/08* (2013.01); *G09G 2320/0233* (2013.01); *G09G 2320/0276* (2013.01); *G09G 2320/0626* (2013.01); *G09G 2320/0673* (2013.01); *G09G 2330/021* (2013.01); *G09G 2360/16* (2013.01)

(58) Field of Classification Search
CPC ... G09G 2300/0819; G09G 2300/0842; G09G 2300/0861; G09G 2310/027; G09G 2310/08; G09G 2320/0233; G09G 2320/0276; G09G 2320/0626; G09G 2320/0673; G09G 2330/021; G09G 2360/16; G09G 3/2007; G09G 3/3233
See application file for complete search history.

(56) References Cited

U.S. PATENT DOCUMENTS

| | | | | |
|---|---|---|---|---|
| 2016/0189635 | A1* | 6/2016 | Lee | G09G 3/3291 345/77 |
| 2019/0019459 | A1* | 1/2019 | Vahid Far | G09G 3/3258 |
| 2023/0186816 | A1* | 6/2023 | Min | G09G 3/3283 345/690 |
| 2023/0196981 | A1* | 6/2023 | Kwon | G09G 3/3233 345/55 |
| 2023/0196982 | A1* | 6/2023 | Lee | G09G 3/3275 345/204 |
| 2024/0212555 | A1* | 6/2024 | Moon | G09G 3/3233 |
| 2024/0233617 | A9* | 7/2024 | Lee | G09G 3/32 |

* cited by examiner

*Primary Examiner* — Dmitriy Bolotin
(74) *Attorney, Agent, or Firm* — Fenwick & West LLP

(57) ABSTRACT

A display apparatus includes a display panel including a plurality of pixels, a data modulator configured to modulate input image data with reference to a gray offset to output modulated image data, a gamma voltage generator configured to output gamma compensation voltages including a plurality of gamma reference tap voltages, and a digital-to-analog converter configured to map the modulated image data to the gamma compensation voltages to output data voltages which are to be input to the plurality of pixels, wherein the gray offset has different magnitudes in a plurality of gray levels.

18 Claims, 11 Drawing Sheets

DISPLAY APPARATUS AND DRIVING METHOD THEREOF

CROSS-REFERENCE TO RELATED APPLICATION

This application claims the benefit of Republic of Korea Patent Application No. 10-2022-0182234 filed on Dec. 22, 2022, which is hereby incorporated by reference in its entirety.

BACKGROUND

Technical Field

The present disclosure relates to a display apparatus and a driving method thereof.

Discussion of the Related Art

Display apparatuses supply pixels with data voltages having different levels by gray levels, so as to display an input image. The data voltages are generated by a digital-to-analog converter, based on gamma compensation voltages generated by a gamma voltage generator.

The description provided in the background section should not be assumed to be prior art merely because it is mentioned in or associated with the background section. The background section may include information that describes one or more aspects of the subject technology.

SUMMARY

Some of the gamma compensation voltages are generated based on a voltage division scheme (i.e., a linear interpolation scheme) through serial resistors. However, due to, for example, a structural characteristic (i.e., an equal interval output characteristic) of the linear interpolation scheme, luminance drop occurs compared to target luminance. Such luminance drop is recognized as a gray step difference, causing a degradation in display quality. To overcome the aforementioned problem of the related art, the present disclosure may provide a display apparatus and a driving method thereof, which may compensate for luminance drop on the basis of a gray offset to decrease a gray step difference.

To achieve these objects and other advantages and in accordance with the purpose of the disclosure, as embodied and broadly described herein, a display apparatus includes a display panel including a plurality of pixels, a data modulator configured to modulate input image data with reference to a gray offset to output modulated image data, a gamma voltage generator configured to output gamma compensation voltages including a plurality of gamma reference tap voltages, and a digital-to-analog converter configured to output the modulated image data to the gamma compensation voltages to output data voltages which are to be input to the plurality of pixels, wherein the gray offset has different magnitudes in a plurality of gray levels, for compensating for gray-based luminance drop occurring in the gamma compensation voltages.

In another aspect of the present disclosure, a driving method of a display apparatus, including a display panel including a plurality of pixels, includes modulating input image data with reference to a gray offset to output modulated image data, outputting gamma compensation voltages including a plurality of gamma reference tap voltages, and mapping the modulated image data to the gamma compensation voltages to output data voltages which are to be input to the plurality of pixels, wherein the gray offset has different magnitudes in a plurality of gray levels, for compensating for gray-based luminance drop occurring in the gamma compensation voltages.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

Figure 1:
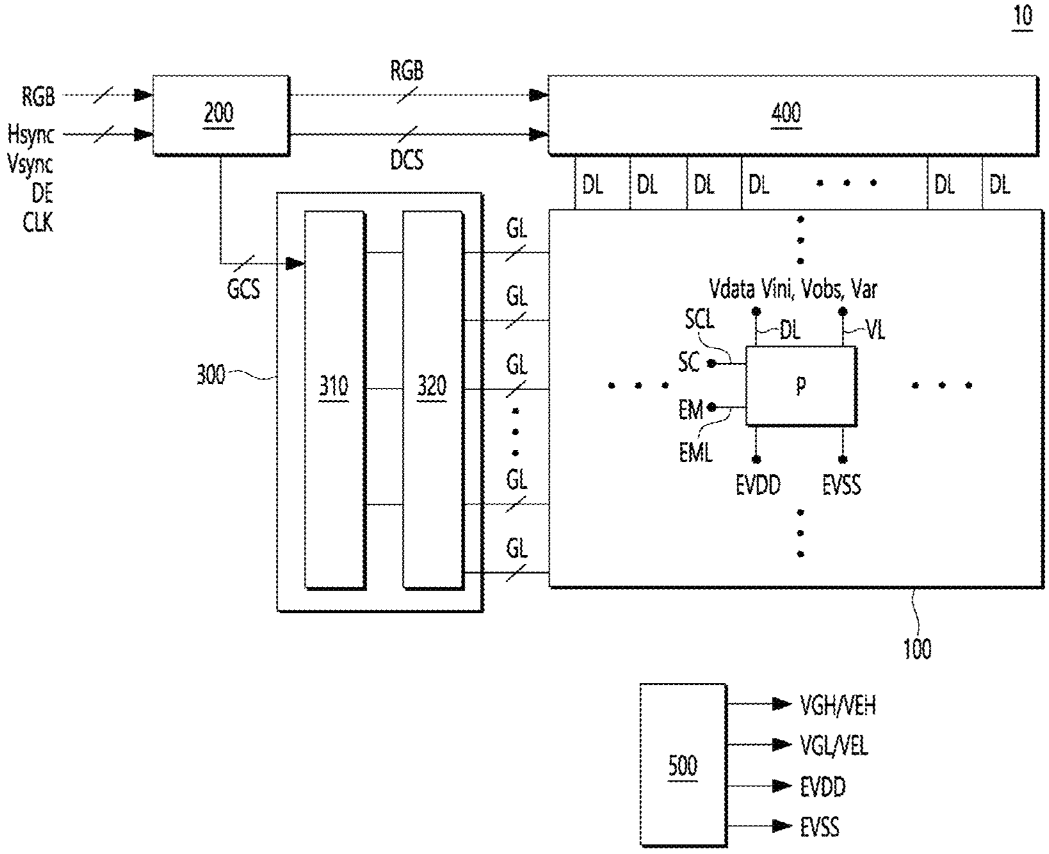
FIG. 1 is a block diagram illustrating a display apparatus according to an exemplary embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Hereinafter, exemplary embodiments of the present disclosure will be described in detail with reference to the accompanying drawings. In the specification, in adding reference numerals for elements in each drawing, it should be noted that like reference numerals already used to denote like elements in other drawings are used for elements wherever possible. In the following description, when the detailed description of the relevant known function or configuration is determined to unnecessarily obscure the important point of the present disclosure, the detailed description will be omitted. The progression of processing steps and/or operations described is an example; however, the sequence of steps and/or operations is not limited to that set forth herein and may be changed as is known in the art, with the exception of steps and/or operations necessarily occurring in a particular order. Names of the respective elements used in the following explanations may be selected only for convenience of writing the specification and may be thus different from those used in actual products.

Advantages and features of the present disclosure, and implementation methods thereof will be clarified through following example embodiments described with reference to the accompanying drawings. The present disclosure may, however, be embodied in different forms and should not be construed as limited to example embodiments set forth herein. Rather, these example embodiments may be provided so that this disclosure may be sufficiently thorough and complete to assist those skilled in the art to fully understand the scope of the present disclosure. Further, the present disclosure is only defined by scopes of claims.

The shapes, sizes, ratios, angles, numbers, and the like, which are illustrated in the drawings to describe various example embodiments of the present disclosure are merely given by way of example. Therefore, the present disclosure is not limited to the illustrations in the drawings. Any implementation described herein as an "example" is not necessarily to be construed as preferred or advantageous over other implementations.

When terms "comprise," "have," and "include" described in the present disclosure may be used, another part may be added unless a more limiting terms, such as "only," is used. The terms of a singular form may include plural forms unless referred to the contrary.

In construing an element, the element is construed as including an error range or tolerance range although there is no explicit description of such an error or tolerance range.

In describing a time relationship, for example, when the temporal order is described as, for example, "after," "subsequent," "next," and "before," a case which is not continuous may be included unless a more limiting term, such as "just," "immediate(ly)," or "direct(ly)" is used.

In the description of the various embodiments of the present disclosure, where positional relationships are described, for example, when a position relation between two parts is described as, for example, "on," "over," "under," and "next," or the like, one or more other parts may be located between the two parts unless a more limiting term, such as "just" or "direct(ly)" is used. For example, where an element or layer is disposed "on" another element or layer, a third layer or element may be interposed therebetween.

The terms, such as "below," "lower," "above," "upper" and the like, may be used herein to describe a relationship between elements as illustrated in the drawings. It will be understood that the terms are spatially relative and based on the orientation depicted in the drawings.

Although the terms "first," "second," A, B, (a), (b), and the like may be used herein to describe various elements, these elements should not be interpreted to be limited by these terms as they are not used to define a particular order or precedence. These terms are used only to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first element, a second element, and a third element" compasses the combination of all three listed elements, combinations of any two of the three elements, as well as each individual element, the first element, the second element, or the third element.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in co-dependent relationship.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning for example consistent with their meaning in the context of the relevant art and should not be interpreted in an idealized or overly formal sense unless expressly so defined herein. For example, the term "part" or "unit" may apply, for example, to a separate circuit or structure, an integrated circuit, a computational block of a circuit device, or any structure configured to perform a described function as should be understood to one of ordinary skill in the art.

FIG. 1 is a block diagram illustrating a display apparatus 10 according to an embodiment of the present disclosure.

Referring to FIG. 1, the display apparatus 10 may include a display panel 100 including a plurality of pixels P, a controller 200, a gate driver 300 which supplies a gate signal to each of the plurality of pixels P, a data driver 400 which supplies a data signal (or a data voltage) to each of the plurality of pixels P, and a power supply unit 500 which supplies power needed for driving of each of the plurality of pixels P, without being limited thereto. As an example, at least one of the above-mentioned components may be omitted. As an example, at least one additional component may be further included.

The display panel 100 may include a display area AA (see FIG. 2) where the plurality of pixels P are provided and a non-display area NA (see FIG. 2) which is disposed to be adjacent to or at least partially surround the display area AA. As an example, the gate driver 300 and/or the data driver 400 may be provided in the non-display area NA, for example, by in a gate-in-panel (GIP) type, without being limited thereto. As an example, the gate driver 300 and/or the data driver 400 may also be connected to the display panel 100 in a tape automated bonding (TAB) type, a chip on glass (COG) type, a chip on panel (COP) type, or a chip on film (COF) type, etc.

In the display panel 100, a plurality of gate lines GL may intersect with a plurality of data lines DL, and each of the plurality of pixels P may be connected with a corresponding gate line GL and a corresponding data line DL. As an example, one pixel P may be supplied with the gate signal from the gate driver 300 through the gate line GL, supplied with a data signal from the data driver 400 through the data line DL, and supplied with a high level driving voltage EVDD and a low level driving voltage EVSS from the power supply unit 500.

The gate line GL may supply a scan signal SC and an emission control signal EM to a plurality of pixels P, and the data line DL may supply a data voltage Vdata to a plurality of pixels P. According to various embodiments, the gate line GL may include a plurality of scan lines SCL for transferring the scan signal SC and/or a plurality of emission control signal lines EML for transferring the emission control signal EM. The plurality of pixels P may be supplied with an initialization voltage (Var, Vini) and a bias voltage Vobs through a power line VL, without being limited thereto.

Figure 2:
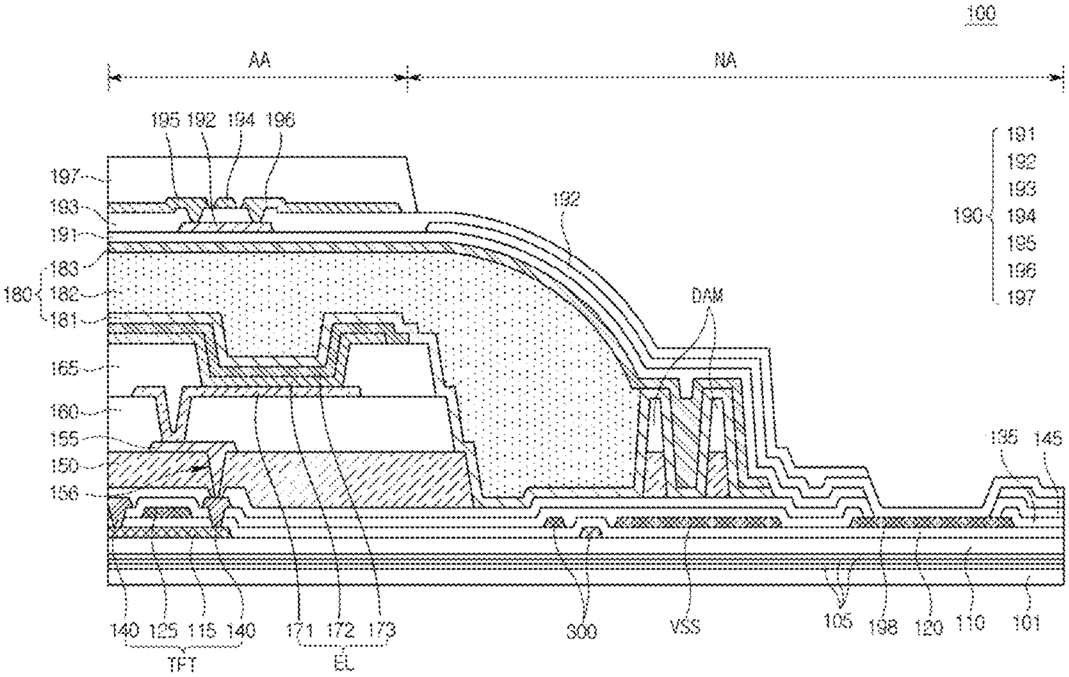
FIG. 2 is a cross-sectional view illustrating a stack type of a display apparatus according to an exemplary embodiment of the present disclosure.

Each pixel P, as illustrated in FIG. 2, may include a light emitting device EL and a pixel circuit which controls driving of the light emitting device EL. The light emitting device EL may include an anode electrode 171, a cathode electrode 173, and an emission layer 172 between the anode electrode 171 and the cathode electrode 173.

The pixel circuit may include at least one switching elements, a driving element, and a capacitor. The switching element and the driving element may each include a thin film transistor (TFT). The driving element may control the amount of current supplied to the light emitting device EL according to the data voltage Vdata to adjust the amount of light emitted from the light emitting device EL. The switching elements may be turned on or off based on the scan signal SC supplied through the plurality of scan lines SCL and/or the emission control signal EM supplied through the emission control line EML.

The display panel 100 may be implemented with a non-transmissive display panel or a transmissive display panel. The transmissive display panel may be applied to a transparent display apparatus where an image is displayed on a screen and a real thing of a background is seen. The display panel 100 may be implemented as a flexible display panel or a rigid display panel. As an example, the flexible display panel may be implemented as an organic light emitting diode (OLED) panel including a plastic substrate, without being limited thereto.

Each pixel P may be divided into a red pixel, a green pixel, and a blue pixel so as to implement colors. Each pixel P may further include a white pixel. Each pixel P may include a pixel circuit. Embodiments are not limited thereto. As an example, pixels of other colors may be also possible.

As an example, touch sensors may be optionally disposed on the display panel 100. A touch input may be sensed by using separate touch sensors, or may be sensed through pixels P. The touch sensors may be arranged on a screen of the display panel 100 in an on-cell or add-on type, or may be implemented as in-cell type touch sensors embedded in the display panel 100.

The controller 200 may process video data RGB input from the outside, based on a size and a resolution of the display panel 100, and may supply image data to the data driver 400. The controller 200 may generate a gate control signal GCS and a data control signal DCS by using synchronization signals (for example, a dot clock signal DCLK, a data enable signal DE, a horizontal synchronization signal Hsync, and a vertical synchronization signal) input from the outside. The controller 200 may supply the gate control signal GCS to the gate driver 300 to control an operation timing of the gate driver 300. The controller 200 may supply the data control signal DCS to the data driver 400 to control an operation timing of the data driver 400. The controller 200 may synchronize an operation timing of the gate driver 300 with an operation timing of the data driver 400 by using the gate control signal GCS and the data control signal DCS.

The controller 200 may be coupled to various processors (for example, a microprocessor, a mobile processor, and an application processor), based on a device with the controller 200 mounted thereon.

The host system be one of a television (TV), a set-top box, a navigation system, a personal computer (PC), a home theater system, a mobile device, a wearable device, and an automotive system, without being limited thereto.

The controller 200 may multiply an input frame frequency by i (where i is a positive number of more than 0) to control an operation timing of each of display panel drivers with a frame frequency of Xi Hz "input frame frequency× i". The input frame frequency may be about 60 Hz in national television standards committee (NTSC) and may be about 50 Hz in phase-alternating line (PAL). Embodiments are not limited thereto. As an example, the input frame frequency may also be a frequency lower than 50 Hz or higher than 60 Hz.

As an example, the controller 200 may drive the pixels P at various refresh rates. The controller 200 may drive the pixels P in a variable refresh rate (VRR) mode, namely, so as to switch between a first refresh rate and a second refresh rate, without being limited thereto. As an example, a third refresh rate or more refresh rates could be included. For example, the controller 200 may simply change a speed of a clock signal, or generate a synchronization signal so that a horizontal blank or a vertical blank occurs, or drive the gate driver 300 by using a mask type to drive the pixels P at various refresh rates.

A voltage level of the gate control signal GCS output from the controller 200 may be shifted to a gate on voltage (VGL, VEL) and a gate off voltage (VGH, VEH) through a level shifter (not shown) and may be supplied to the gate driver 300. The level shifter may shift a low level voltage of the gate control signal GCS to a gate on voltage VGL and may shift a high level voltage of the gate control signal GCS to a gate off voltage VGH. Embodiments are not limited thereto. As an example, the level shifter may also shift a high level voltage of the gate control signal GCS to a gate on voltage VGL and may shift a low level voltage of the gate control signal GCS to a gate off voltage VGH, depending on the type of the corresponding transistor. The gate control signal GCS may include a start pulse and a shift clock, without being limited thereto.

The gate driver 300 may supply the gate signal to the gate line GL, based on the gate control signal GCS supplied from the controller 200. The gate driver 300 may be disposed at one side or both sides of the display panel 100 in a gate in panel (GIP) type, without being limited thereto.

The gate driver 300 may sequentially output the gate signal to the plurality of gate lines GL, based on control by the controller 200. The gate driver 300 may shift the gate signal by using a shift register, and thus, may sequentially supply corresponding signals to the gate lines GL.

The gate signal may include the scan signal SC and the emission control signal EM in an organic light emitting display apparatus. The scan signal SC may include a scan pulse which swings between the gate on voltage VGL and the gate off voltage VGH. The emission control signal EM may include an emission control signal pulse which swings between the gate on voltage VEL and the gate off voltage VEH. The scan pulse may select pixels P of a line in which a data voltage Vdata is to be written. The emission control signal EM may define an emission time of each of the pixels P.

The gate driver 300 may include an emission control signal driver 310 and at least one scan driver 320, without being limited thereto. As an example, the emission control signal driver 310 may be omitted according to the design.

The emission control signal driver 310 may output the emission control signal pulse in response to the start pulse and the shift clock from the controller 200 and may sequentially shift the emission control signal pulse, based on the shift clock.

In response to the start pulse and the shift clock from the controller 200, the at least one scan driver 320 may output the scan pulse and may shift the scan pulse, based on a shift clock timing.

The data driver 400 may convert image data RGB into a data voltage Vdata, based on the data control signal DCS supplied from the controller 200, and may supply the data voltage Vdata to the pixel P through the data line DL.

In FIG. 1, it is illustrated that the data driver 400 is disposed at one side of the display panel 100 in one type, but the number and arrangement positions of data drivers 400 are not limited thereto. That is, the data driver 400 may be configured with a plurality of integrated circuits (ICs) and may be divided into a plurality of data drivers and disposed at one or more sides of the display panel 100.

The power supply unit 500 may generate direct current (DC) power needed for driving of the display panel driver and a pixel array of the display panel 100 by using a DC-DC converter. The DC-DC converter may include a charge pump, a regulator, a buck converter, and a boost converter. The power supply unit 500 may receive a DC input voltage applied from the host system (not shown) to generate a DC voltage such as the gate on voltage VGL (VEL), the gate off voltage VGH (VEH), the high level driving voltage EVDD, and the low level driving voltage EVSS. The gate on voltage VGL (VEL) and the gate off voltage VGH (VEH) may be supplied to the level shifter (not shown) and the gate driver 300. The high level driving voltage EVDD and the low level driving voltage EVSS may be supplied to the pixels P in common.

FIG. 2 is a cross-sectional view illustrating a stack type of a display apparatus according to an embodiment of the present disclosure.

Referring to FIG. 2, a thin film transistor TFT for driving the light emitting device EL may be disposed in the display area AA, on a substrate 101 of the display panel 100. The thin film transistor TFT may include a semiconductor layer 115, a gate electrode 125, and a source and drain electrode 140. For convenience of description, only a driving transistor DT (see FIG. 4) of various thin film transistors included in the pixel circuit is illustrated, but is not limited thereto and another thin film transistor such as a switching transistor may be included in the pixel circuit. Also, in the present disclosure, the thin film transistor may be described as having a coplanar structure, but is not limited thereto and the thin film transistor may be implemented in another structure such as a staggered structure.

As an example, at least one of the driving transistor DT and the switching transistor included in the pixel circuit may use an oxide semiconductor as an active layer. A thin film transistor using an oxide semiconductor material as the active layer may be good in effect of reducing or preventing the occurrence of a leakage current and may be relatively lower in manufacturing cost than a thin film transistor using a polycrystalline semiconductor material as the active layer. Accordingly, in order to reduce power consumption and decrease the manufacturing cost, the pixel circuit may include at least one switching transistor or the driving transistor DT including the oxide semiconductor material.

All thin film transistors configuring the pixel circuit may be implemented with the oxide semiconductor material, or only some thin film transistors may be implemented with the oxide semiconductor material. However, a thin film transistor using the oxide semiconductor material may be difficult to secure reliability, and a thin film transistor using the polycrystalline semiconductor material may be high in operation speed and good in reliability. Accordingly, an embodiment of the present disclosure may include any of the thin film transistor using the oxide semiconductor material and the thin film transistor using the polycrystalline semiconductor material. Embodiments are not limited thereto. As an example, at least one of the driving transistor DT and the switching transistor included in the pixel circuit may use other semiconductor, such as an amorphous semiconductor material, a compound semiconductor material, pentacene, etc., as an active layer.

The driving transistor DT may receive the high level driving voltage EVDD to control a current supplied to the light emitting device EL, in response to a data signal supplied to a gate electrode 125 thereof, and thus, may control the amount of light emitted from the light emitting device EL, whereby the light emitting device EL may maintain the emission of light as a constant current is supplied by a voltage charged into a storage capacitor (not shown) until a data signal of a next frame is supplied thereto.

Hereinafter, the driving transistor DT will be described as a thin film transistor TFT. The thin film transistor TFT, as illustrated in FIG. 2, may include a semiconductor layer 115 disposed on a first insulation layer 110, a gate electrode 125 overlapping the semiconductor layer 115 with a second insulation layer 120 therebetween, and a source and drain electrode 140 which are formed on a third insulation layer 135 to contact the semiconductor layer 115.

The semiconductor layer 115 may be a region where a channel is formed in driving the thin film transistor TFT. The semiconductor layer 115 may include an oxide semiconductor, or may include various organic semiconductors such as amorphous silicon (a-Si), polycrystalline silicon (poly-Si), and pentacene, but embodiments of the present disclosure are not limited thereto. The semiconductor layer 115 may be formed on the first insulation layer 110. The semiconductor layer 115 may include a channel region, a source region, and a drain region. The channel region may overlap the gate electrode 125 with the second insulation layer 120 therebetween to form the channel region between the source electrode 140 and the drain electrode 140. The source region may be electrically connected with the source electrode 140 through a contact hole passing through the second insulation layer 120 and the third insulation layer 135. The drain region may be electrically connected with the drain electrode 140 through a contact hole passing through the second insulation layer 120 and the third insulation layer 135. The buffer layer 105 and the first insulation layer 110 may be disposed between the semiconductor layer 115 and the substrate 101. The buffer layer 105 may delay the diffusion of water and/or oxygen penetrating into the substrate 101. The first insulation layer 110 may protect the semiconductor layer 115 and may reduce or prevent the occurrence of various defects flowing in from the substrate 101. Embodiments are not limited thereto. As an example, at least one of the above-mentioned components could be omitted, or an additional component could be further included.

As an example, an uppermost layer of the buffer layer 105 contacting the first insulation layer 110 may include a material having an etching characteristic which differs from that of each of the other layers of the buffer layer 105, the first insulation layer 110, the second insulation layer 120, and the third insulation layer 135. The uppermost layer of the buffer layer 105 contacting the first insulation layer 110 may include one material of nitride silicon (SiNx) and oxide silicon (SiOx), without being limited thereto. The other layers of the buffer layer 105, the first insulation layer 110, the second insulation layer 120, and the third insulation layer 135 may include the other material of SiNx and SiOx, without being limited thereto. For example, the uppermost layer of the buffer layer 105 contacting the first insulation layer 110 may include SiNx, and the other layers of the buffer layer 105, the first insulation layer 110, the second insulation layer 120, and the third insulation layer 135 may include SiOx, but embodiments of the present disclosure are not limited thereto.

The gate electrode 125 may be formed on the second insulation layer 120 and may overlap the channel region of the semiconductor layer 115 with the second insulation layer 120 therebetween. The gate electrode 125 may include a first conductive material of a single layer or a multilayer including one of magnesium (Mo), aluminum (Al), chrome (Cr), gold (Au), titanium (Ti), nickel (Ni), neodymium (Nd), and copper (Cu), etc., or an alloy of two or more thereof, but embodiments of the present disclosure are not limited thereto.

The source electrode 140 may contact the source region of the semiconductor layer 115 exposed through a contact hole passing through the second insulation layer 120 and the third insulation layer 135. The drain electrode 140 may face the source electrode 140 and may contact the drain region of the semiconductor layer 115 through a contact hole passing through the second insulation layer 120 and the third insulation layer 135.

The source region and the drain region may each be region which has conductivity by doping Group 5 or 3 impurity ions (for example, phosphorus (P) or boron (B)) on an intrinsic semiconductor material at a certain concentration. The channel region may be a region where the semiconductor material maintains an intrinsic state and may provide a path through which a hole or an electron moves.

The source and drain electrode 140 may include a second conductive material of a single layer or a multilayer including one of magnesium (Mo), aluminum (Al), chrome (Cr), gold (Au), titanium (Ti), nickel (Ni), neodymium (Nd), and copper (Cu), etc., or an alloy of two or more thereof, but embodiments of the present disclosure are not limited thereto.

The connection electrode 155 may be disposed between a first middle layer 150 and a second middle layer 160. The connection electrode 155 may be exposed through a connection electrode contact hole 156 passing through a protection layer 145 and the first middle layer 150 and may contact the drain electrode 140. The connection electrode 155 may include a material having a resistivity which is equal or similar to that of the drain electrode 140, but embodiments of the present disclosure are not limited thereto. As an example, the connection electrode 155 may be omitted according to the design.

Referring to FIG. 2, the light emitting device EL including the emission layer 172 may be disposed on the second middle layer 160 and a bank layer 165. The light emitting device EL may include an anode electrode 171, at least one emission layer 172 formed on the anode electrode 171, and a cathode electrode 173 formed on the emission layer 172.

The anode electrode 171 may be disposed on the second middle layer 160 and may be electrically connected with the connection electrode 155 exposed upward from the second middle layer 160 through a contact hole passing through the second middle layer 160.

The anode electrode 171 of each pixel may be formed to be exposed by the bank layer 165. The bank layer 165 may include an opaque material (for example, black), so as to reduce or prevent light interference between adjacent pixels. In this case, the bank layer 165 may include a light blocking material including one of a color pigment, organic black, and carbon, but embodiments of the present disclosure are not limited thereto.

Referring to FIG. 2, at least one emission layer 172 may be formed on the anode electrode 171 of an emission region provided by the bank layer 165. The at least one emission layer 172 may include a hole transport layer, a hole injection layer, a hole blocking layer, a light emission layer, an electron injection layer, an electron blocking layer, and an electron transport layer on the anode electrode 171 and may be formed as the layers are stacked in order or in reverse order in an emission direction, without being limited thereto. As an example, at least one of the hole transport layer, the hole injection layer, the hole blocking layer, the electron injection layer, the electron blocking layer, and the electron transport layer may be omitted. In addition, as an example, the emission layer 172 may include first and second emission stacks opposite to each other with a charge generating layer therebetween. In this case, one of the first and second emission stacks may generate blue light and the other of the first and second emission stacks may generate yellow-green light, and thus, white light may be generated through the first and second emission stacks. Embodiments are not limited thereto. As an example, more than two emission stacks may be included. As an example, a light of a color other than the white light may be generated through the emission stacks. The light generated by the emission stacks may be incident on a color filter which is disposed on or under the emission layer 172, and thus, a color image may be implemented. As another example, without a separate color filter, each emission layer 172 may generate color light corresponding to each pixel to implement a color image. For example, an emission layer 172 of a red pixel may generate red light, an emission layer 172 of a green pixel may generate green light, and an emission layer 172 of a blue pixel may generate blue light. Embodiments are not limited thereto. As an example, an emission layer 172 of a pixel of other colors may be also possible.

Referring to FIG. 2, the cathode electrode 173 may be formed to be opposite to the anode electrode 171 with the emission layer 172 therebetween and may be supplied with the high level driving voltage EVDD.

An encapsulation layer 180 may reduce or prevent the penetration of external water or oxygen into the light emitting device EL. To this end, the encapsulation layer 180 may include an at least one-layered inorganic encapsulation layer and an at least one-layered organic encapsulation layer, but embodiments of the present disclosure are not limited thereto. In the present disclosure, a structure of the encapsulation layer 180 where a first encapsulation layer 181, a second encapsulation layer 182, and a third encapsulation layer 183 are sequentially stacked will be described for example.

The first encapsulation layer 181 may be formed on the substrate 101 where the cathode electrode 173 is formed. The third encapsulation layer 183 may be formed on the substrate 101 where the second encapsulation layer 182 is formed and may be formed to surround an upper surface, a lower surface, and a lateral surface of the second encapsulation layer 182 along with the first encapsulation layer 181. The first encapsulation layer 181 and the third encapsulation layer 183 may reduce or minimize or prevent the penetration of external water or oxygen into the light emitting device EL. The first encapsulation layer 181 and the third encapsulation layer 183 may include an inorganic insulating material capable of low temperature deposition like SiNx, SiOx, oxynitride silicon (SiON), or oxide aluminum ($Al_2O_3$), without being limited thereto. The first encapsulation layer 181 and the third encapsulation layer 183 may be deposited at a low temperature atmosphere, and thus, may reduce or prevent the light emitting device EL vulnerable to a high temperature atmosphere from being damaged in a deposition process of the first encapsulation layer 181 and the third encapsulation layer 183.

The second encapsulation layer 182 may reduce stress between layers and may planarize a step height between layers. As an example, the stress between layers may be caused by bending of the display apparatus 10. The second encapsulation layer 182 may be formed of a non-photosensitive organic insulating material, such as acryl resin, epoxy resin, phenolic resin, polyamide resin, polyimide resin, polyethylene, or silicon oxycarbon (SiOC), or a photosensitive organic insulating material such as photo acryl, on the substrate 101 where the first encapsulation layer 181 is formed, but embodiments of the present disclosure are not limited thereto. In a case where the second encapsulation layer 182 is formed by an inkjet process, a dam DAM may be disposed to reduce or prevent the second encapsulation layer 182 of liquid from being diffused to an edge of the substrate 101. The dam DAM may be disposed closer to the edge of the substrate 101 than the second encapsulation layer 182. Based on the dam DAM, the second encapsulation layer 182 may be reduced or prevented from being diffused to a pad region where a conductive pad is provided.

The dam DAM may be designed to reduce or prevent the diffusion of the second encapsulation layer 182. When the second encapsulation layer 182 is formed to pass over a height of the dam DAM in performing a process, the second encapsulation layer 182 which is an organic layer may be exposed to the outside, and thus, water may penetrate into the light emitting device EL. Accordingly, in order to solve such a problem, the dam DAM may be formed to have a height higher than the second encapsulation layer 182. As an example, the dam DAM may be formed so that at least two, three, five, or even eleven dams are formed.

Referring to FIG. 2, the dam DAM may be disposed on the protection layer 145 of the non-display area NA. Also, the dam DAM may be formed simultaneously with the first middle layer 150 and/or the second middle layer 160, without being limited thereto. As an example, a lower layer of the dam DAM may be formed together when the first middle layer 150 is formed, and an upper layer of the dam DAM may be formed together when the second middle layer 160 is formed, and thus, the dam DAM may be stacked and formed in a double structure. Accordingly, the dam DAM may include the same material as that of each of the first middle layer 150 and the second middle layer 160, but embodiments of the present disclosure are not limited thereto.

Referring to FIG. 2, the dam DAM may be formed to overlap a low level driving power line VSS. For example, the low level driving power line VSS may be formed in a lower layer of a region where the dam DAM is disposed, in the non-display area NA.

The low level driving power line VSS and the gate driver 300 provided as the GIP type may be formed to surround an outer portion of the display panel, and the low level driving power line VSS may be disposed more outward than the gate driver 300. Also, the low level driving power line VSS may be connected with the cathode electrode 173 and may apply a common voltage. The gate driver 300 may be simply expressed in the drawing of a plane and a cross-sectional surface, but may be configured by using a thin film transistor TFT having the same or similar structure as that of a thin film transistor TFT of the display area AA.

Referring to FIG. 2, the low level driving power line VSS may be disposed more outward than the gate driver 300. The low level driving power line VSS may be disposed more outward than the gate driver 300 and may at least partially surround the display area AA. The low level driving power line VSS may include the same or similar material as that of the source and drain electrode 140 of the thin film transistor TFT, but embodiments of the present disclosure are not limited thereto. For example, the low level driving power line VSS may include the same or different material as that of the gate electrode 125, without being limited thereto.

Moreover, the low level driving power line VSS may be electrically connected with the cathode electrode 173. The low level driving power line VSS may transfer the low level driving voltage EVSS to the plurality of pixels of the display area AA.

A touch layer 190 may be optionally disposed on the encapsulation layer 180. A touch buffer layer 191 may be disposed between a touch sensor metal, including touch electrode connection lines 192 and 194 and touch electrodes 195 and 196 in the touch layer 190, and the cathode electrode 173 of the light emitting device EL.

The touch buffer layer 191 may reduce or prevent external water or a chemical solution (e.g., a developer or an etchant), used in a manufacturing process of the touch sensor metal disposed on the touch buffer layer 191, from penetrating into the emission layer 172 including an organic material. Accordingly, the touch buffer layer 191 may reduce or prevent the damage of the emission layer 172, which is vulnerable to a chemical solution or water.

The touch buffer layer 191 may be formed at a certain temperature (for example, a temperature of 100° C. or less) and may include an insulating material (e.g., organic insulating material) having a low dielectric constant of 1 to 3, so as to reduce or prevent the damage of the emission layer 172 including an organic material vulnerable to a high temperature. For example, the touch buffer layer 191 may include acryl, epoxy, or siloxane-based material, without being limited thereto. The touch buffer layer 191 including an organic insulating material and having planarization performance may reduce or prevent a broken phenomenon of the touch sensor metal formed on the touch buffer layer 191 and the damage of the encapsulation layer 180 caused, for example, by bending of an organic light emitting display apparatus.

According to a touch sensor structure based on a mutual capacitance, the touch electrodes 195 and 196 may be disposed on the touch buffer layer 191, and the touch electrodes 195 and 196 may be disposed to intersect with each other.

The touch electrode connection lines 192 may electrically connect the touch electrodes 195 with each other and the touch electrode connection lines 194 may electrically connect the touch electrodes 196 with each other. At least one of the touch electrode connection lines 192 and 194 and the touch electrodes 195 and 196 may be disposed on different layers from others with the touch insulation layer 193 therebetween.

The touch electrode connection lines 192 and 194 may be disposed to overlap the bank layer 165 and may prevent an aperture ratio from being reduced, without being limited thereto. As another example, the touch electrode connection lines 192 and 194 may at least partially overlap the emission region. As an example, the touch electrode connection lines 192 and 194 and the touch electrodes 195 and 196 may be formed of transparent conductive materials, without being limited thereto.

Furthermore, the touch electrodes 195 and 196 may be electrically connected with a touch driving circuit (not shown) through the touch pad 198 because a portion of the touch electrode connection line 192 passes by an upper surface and a lateral surface of the encapsulation layer 180 and an upper surface and a lateral surface of the dam DAM.

A portion of the touch electrode connection line 192 may be supplied with a touch driving signal from the touch driving circuit and may transfer the touch driving signal to the touch electrodes 195 and 196, or may transfer a touch sensing signal, obtained through the touch electrodes 195 and 196, to the touch driving circuit.

A touch protection layer 197 may be disposed on the touch electrodes 195 and 196. In the drawing, the touch protection layer 197 is illustrated as being disposed on only the touch electrodes 195 and 196, but is not limited thereto and the touch protection layer 197 may extend up to a front or rear portion of the dam DAM and may also be disposed on the touch electrode connection line 192.

Moreover, a color filter (not shown) may be further optionally provided on the encapsulation layer 180. As an example, the color filter may be disposed on the touch layer 190 or may be disposed between the encapsulation layer 180 and the touch layer 190, without being limited thereto.

Figure 3:
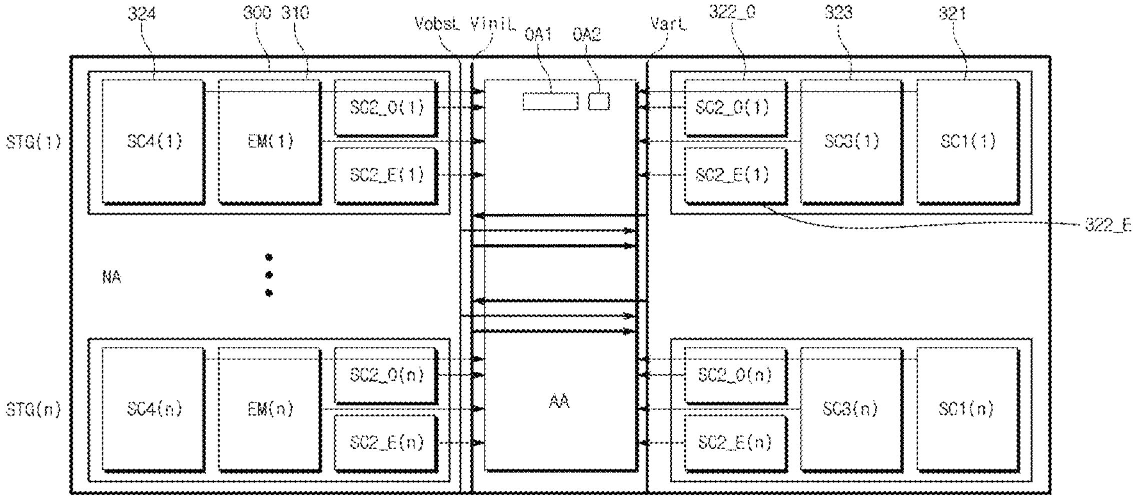
FIG. 3 is a block diagram illustrating a configuration of a gate driver, in a display apparatus according to an exemplary embodiment of the present disclosure.

FIG. 3 is a block diagram illustrating a configuration of a gate driver 300, in a display apparatus according to an embodiment of the present disclosure.

Referring to FIG. 3, the gate driver 300 may include an emission control signal driver 310 and a scan driver 320, and the scan driver 320 may be configured with first to fourth scan drivers 321 to 324. Also, the second scan driver 322 may be configured with an odd-numbered second scan driver 322_0 and an even-numbered second scan driver 322_E.

As an example, the gate driver 300 may include shift registers which are provided to be symmetric with each other at both sides of the display area AA. As an example, the gate driver 300 may be configured so that the shift register at one side of the display area AA includes second scan drivers 322_0 and 322_E, the fourth scan driver 324, and an emission control signal driver 310, and the shift register at the other side of the display area AA includes the first scan driver 321, second scan drivers 322_0 and 322_E, and the third scan driver 323. However, embodiments of the present disclosure are not limited thereto, and the emission control signal driver 310 and the first to fourth scan drivers 321 to 324 may be differently arranged according to embodiments.

Each of stages STG1 to STGn of the shift register may include first scan signal generators SC1(1) to SC1(n), second scan signal generators SC2_O(1) to SC2_O(n) and SC2_E(1) to SC2_E(n), third scan signal generators SC3(1) to SC3(n), fourth scan signal generators SC4(1) to SC4(n), and emission control signal generators EM(1) to EM(n).

The first scan signal generators SC1(1) to SC1(n) may output first scan signals SC1(1) to SC1(n) through first scan lines SCL1 of the display panel 100. The second scan signal generators SC2(1) to SC2(n) may output second scan signals SC2(1) to SC2(n) through second scan lines SCL2 of the display panel 100. The third scan signal generators SC3(1) to SC3(n) may output third scan signals SC3(1) to SC3(n) through third scan lines SCL3 of the display panel 100. The fourth scan signal generators SC4(1) to SC4(n) may output fourth scan signals SC4(1) to SC4(n) through fourth scan lines SCL4 of the display panel 100. The emission control signal generators EM(1) to EM(n) may output emission control signals EM(1) to EM(n) through emission control lines EML of the display panel 100.

The first scan signals SC1(1) to SC1(n) may be used as a signal for driving an $A^{th}$ switching transistor (for example, a compensation transistor) included in the pixel circuit. The second scan signals SC2(1) to SC2(n) may be used as a signal for driving a $B^{th}$ switching transistor (for example, a data supply transistor) included in the pixel circuit. The third scan signals SC3(1) to SC3(n) may be used as a signal for driving a $C^{th}$ switching transistor (for example, a bias transistor) included in the pixel circuit. The fourth scan signals SC4(1) to SC4(n) may be used as a signal for driving a $D^{th}$ switching transistor (for example, an initialization transistor) included in the pixel circuit. The emission control signals EM(1) to EM(n) may be used as a signal for driving an $E^{th}$ switching transistor (for example, an emission control transistor) included in the pixel circuit. For example, emission control transistors of pixels may be controlled by using the emission control signals EM(1) to EM(n), and thus, an emission time of a light emitting device may vary.

Referring to FIG. 3, a bias voltage bus line VobsL, a first initialization voltage bus line VarL, and a second initialization bus line ViniL may be disposed between the gate driver 300 and the display area AA.

The bias voltage bus line VobsL, the first initialization voltage bus line VarL, and the second initialization bus line ViniL may respectively transfer a bias voltage Vobs, a first initialization voltage Var, and a second initialization voltage Vini, received from the power supply unit 500, to the pixel circuit.

In FIG. 3, each of the bias voltage bus line VobsL, the first initialization voltage bus line VarL, and the second initialization bus line ViniL is illustrated as being disposed at only one side of a left side or a right side of the display area AA, but embodiments of the present disclosure are not limited thereto. In other embodiments, each of the bias voltage bus line VobsL, the first initialization voltage bus line VarL, and the second initialization bus line ViniL may be disposed at both sides, or although disposed at one side, a position of the left side or the right side is not limited.

Referring to FIG. 3, one or more optical regions OA1 and OA2 may be optionally disposed in the display area AA. As an example, the one or more optical regions OA1 and OA2 may be omitted according to the design.

The one or more optical regions OA1 and OA2 may be disposed to overlap one or more optical electronic devices such as a proximity sensor, an illumination sensor, and a photographing device such as a camera (an image sensor).

The one or more optical regions OA1 and OA2 may have a light transmission structure for an operation of an optical electronic device, and thus, may have a transmittance of a certain level or more. As an example, the number of pixels P per unit area in the one or more optical regions OA1 and OA2 may be less than the number of pixels P per unit area in a general area except for the one or more optical regions OA1 and OA2 in the display area AA. That is, a resolution of the one or more optical regions OA1 and OA2 may be lower than a resolution of the general area in the display area AA. Embodiments are not limited thereto. As an example, the resolution of the one or more optical regions OA1 and OA2 may be also equal to the resolution of the general area in the display area AA. As an example, a size of the pixels P in the one or more optical regions OA1 and OA2 may be smaller than a size of pixels P in the general area in the display area AA, without being limited thereto.

In the one or more optical regions OA1 and OA2, the light transmission structure may be configured, for example, by patterning a cathode electrode in a portion where the pixel P is not disposed. In this case, a patterned cathode electrode may be removed by a laser beam or by an etching method, or the cathode electrode may be selectively formed and patterned, for example, by using a material such as a cathode deposition prevention layer, or by using a mask process, without being limited thereto.

Moreover, in the one or more optical regions OA1 and OA2, the light transmission structure may be formed by isolating the light emitting device EL from the pixel circuit in the pixel P. As an example, the light emitting device EL of the pixel P may be disposed in the one or more optical regions OA1 and OA2, and a plurality of transistors TFT configuring the pixel circuit may be disposed at peripheries of the one or more optical regions OA1 and OA2, and thus, the light emitting device EL may be connected with the pixel circuit, for example, through a transparent metal layer, without being limited thereto.

Figure 4:
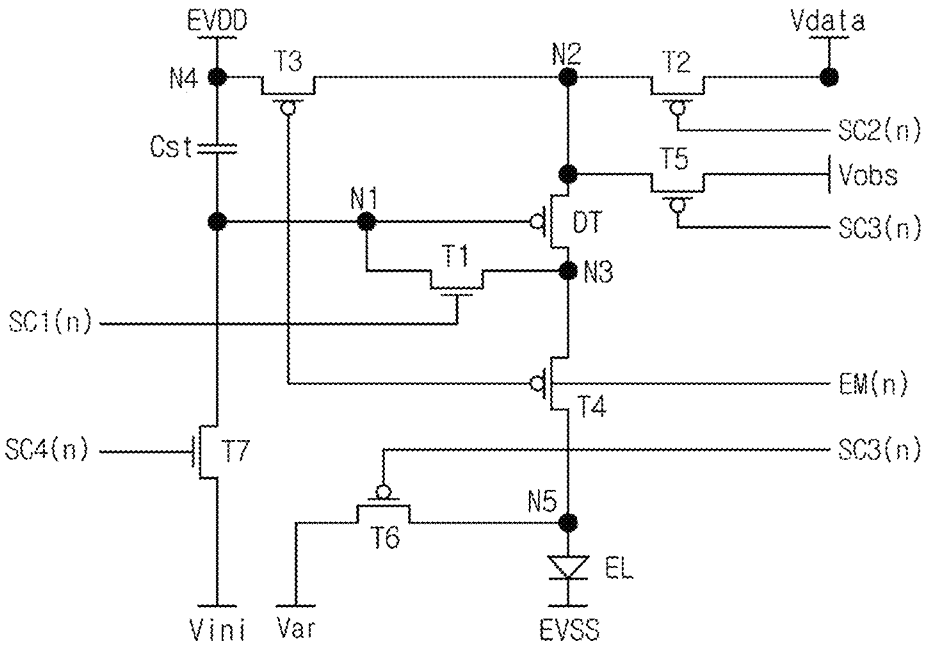
FIG. 4 is a diagram illustrating a pixel circuit, in a display apparatus according to an exemplary embodiment of the present disclosure.

FIG. 4 is a diagram illustrating a pixel circuit, in a display apparatus according to an embodiment of the present disclosure.

FIG. 4 merely illustrates a pixel circuit. The pixel circuit according to the present disclosure may include a structure where an emission operation of a light emitting device EL may be controlled by applying an emission control signal EM(n). For example, the pixel circuit may include a switching transistor to which an additional scan signal is applied and a switching transistor to which an additional initialization voltage is applied, and a connection relationship of the switching transistors or a connection position of a capacitor may be variously implemented. Hereinafter, for convenience, a display apparatus having a pixel circuit structure of FIG. 4 will be described.

Referring to FIG. 4, each of a plurality of pixels P may include a pixel circuit including a driving transistor DT and a light emitting device EL connected with the pixel circuit.

The pixel circuit may control a driving current flowing in the light emitting device EL to drive the light emitting device EL. The pixel circuit may include the driving transistor DT, first to seventh switching transistors T1 to T7, and a capacitor Cst. Each of the transistors D1 and T1 to T7 may include a first electrode, a second electrode, and a gate electrode. One of the first electrode and the second electrode may be a source electrode, and the other of the first electrode and the second electrode may be a drain electrode.

Each of the transistors D1 and T1 to T7 may be a P-type thin film transistor or an N-type thin film transistor. In the embodiment of FIG. 4, a first switching transistor T1 and a seventh switching transistor T7 may each be an N-type thin film transistor, and the other transistors DT and T2 to T6 may each be a P-type thin film transistor. However, embodiments of the present disclosure are not limited thereto, and according to embodiments, all or some of the transistors DT and T1 to T7 may each be a P-type thin film transistor or may each be an N-type thin film transistor. As an example, an N-type thin film transistor may be an oxide thin film transistor, and a P-type thin film transistor may be a polycrystalline silicon thin film transistor. Embodiments are not limited thereto. As an example, the N-type thin film transistor or the P-type thin film transistor may be any of an oxide thin film transistor, a polycrystalline silicon thin film transistor or a thin film transistor of other type.

Hereinafter, it is described that each of the first switching transistor T1 and the seventh switching transistor T7 is an N-type thin film transistor, and each of the other transistors DT and T2 to T6 is a P-type thin film transistor. Therefore, the first switching transistor T1 and the seventh switching transistor T7 may be turned on in response to a high voltage, and the other transistors DT and T2 to T6 may be turned on in response to a low voltage.

According to an embodiment, the first switching transistor T1 configuring the pixel circuit may be a compensation transistor, the first switching transistor T1 configuring the pixel circuit may be a compensation transistor, the second switching transistor T2 may be a data supply transistor, the third and fourth switching transistors T3 and T4 may be an emission control transistor, the fifth switching transistor T5 may be a bias transistor, and the sixth and seventh switching transistors T6 and T7 may each function as an initialization transistor. The light emitting device EL may include an anode electrode and a cathode electrode. The anode electrode of the light emitting device EL may be connected with a fifth node N5, and the cathode electrode may be connected with a low level driving voltage EVSS.

The driving transistor DT may include a first electrode connected with a second node N2, a second electrode connected with a third node N3, and a gate electrode connected with a first node N1. The driving transistor DT may provide the light emitting device EL with a driving current corresponding to a voltage of the first node N1 (or a data voltage Vdata stored in the capacitor Cst described below).

The first switching transistor T1 may include a first electrode connected with the first node N1, a second electrode connected with the third node N3, and a gate electrode which receives the first scan signal SC1(n). The first transistor T1 may be turned on in response to the first scan signal SC1(n) and may connect the first node N1 with the third node N3, and thus, the driving transistor DT may operate like a diode, thereby sampling a threshold voltage Vth of the driving transistor DT. The first switching transistor T1 may be a compensation transistor.

The capacitor Cst may be connected between the first node N1 and the fourth node N4. The capacitor Cst may store or hold a high level driving voltage EVDD.

The second switching transistor T2 may include a first electrode connected with a data line DL (or receiving the data voltage Vdata), a second electrode connected with the second node N2, and a gate electrode which receives the second scan signal SC2(n). The second switching transistor T2 may be turned on in response to the second scan signal SC2(n) and may transfer the data voltage Vdata to the second node N2. The second switching transistor T2 may be a data supply transistor.

The third switching transistor T3 and the fourth switching transistor T4 (or the first and second emission control transistors) may be connected between the high level driving voltage EVDD and the light emitting device EL and may provide a current movement path through which a driving current generated by the driving transistor DT moves.

The third switching transistor T3 may include a first electrode which is connected with the fourth node N4 and receives the high level driving voltage EVDD, a second electrode connected with the second node N2, and a gate electrode which receives the emission control signal EM(n).

The fourth switching transistor T4 may include a first electrode connected with the third node N3, a second electrode connected with the fifth node N5 (or the anode electrode of the light emitting device EL), and a gate electrode which receives the emission control signal EM(n).

The third and fourth switching transistors T3 and T4 may be turned on in response to the emission control signal EM(n), and in this case, the driving current may be provided to the light emitting device EL and the light emitting device EL may emit light having luminance corresponding to the driving current.

The fifth switching transistor T5 may include a first electrode which receives the bias voltage Vobs, a second electrode connected with the second node N2, and a gate electrode which receives the third scan signal SC3(n). The fifth switching transistor T5 may be a bias transistor.

The sixth switching transistor T6 may include a first electrode which receives the first initialization voltage Var, a second electrode connected with the fifth node N5, and a gate electrode which receives the third scan signal SC3(n).

Before the light emitting device EL emits light (or after the light emitting device EL emits light), the sixth switching transistor T6 may be turned on in response to the third scan signal SC3(n) and may initialize the anode electrode (or a pixel electrode) of the light emitting device EL with the first initialization voltage Var. The light emitting device EL may include a parasitic capacitor formed between the anode electrode and the cathode electrode. Also, the parasitic capacitor may be charged while the light emitting device EL is emitting light, and thus, the anode electrode of the light emitting device EL may have a specific voltage. Accordingly, the first initialization voltage Var may be applied to the anode electrode of the light emitting device EL through the sixth switching transistor T6, and thus, the amount of electric charges accumulated into the light emitting device EL may be initialized.

In the present disclosure, the gate electrodes of the fifth and sixth switching transistors T5 and T6 may receive the third scan signal SC3(n) in common. However, embodiments of the present disclosure are not limited thereto, and the gate electrodes of the fifth and sixth switching transistors T5 and T6 may be independently controlled based on a separate scan signal.

The seventh switching transistor T7 may include a first electrode which receives the second initialization voltage Vini, a second electrode connected with the first node N1, and a gate electrode which receives the fourth scan signal SC4(n).

The seventh switching transistor T7 may be turned on in response to the fourth scan signal SC4(n) and may initialize the gate electrode of the driving transistor DT with the second initialization voltage Vini. An undesired electric charge may remain in the gate electrode of the driving transistor DT due to the high level driving voltage EVDD stored in the capacitor Cst. Accordingly, the second initialization voltage Vini may be applied to the gate electrode of the driving transistor DT through the seventh switching transistor T7, and thus, a residual electric charge may be initialized.

Figure 5A:
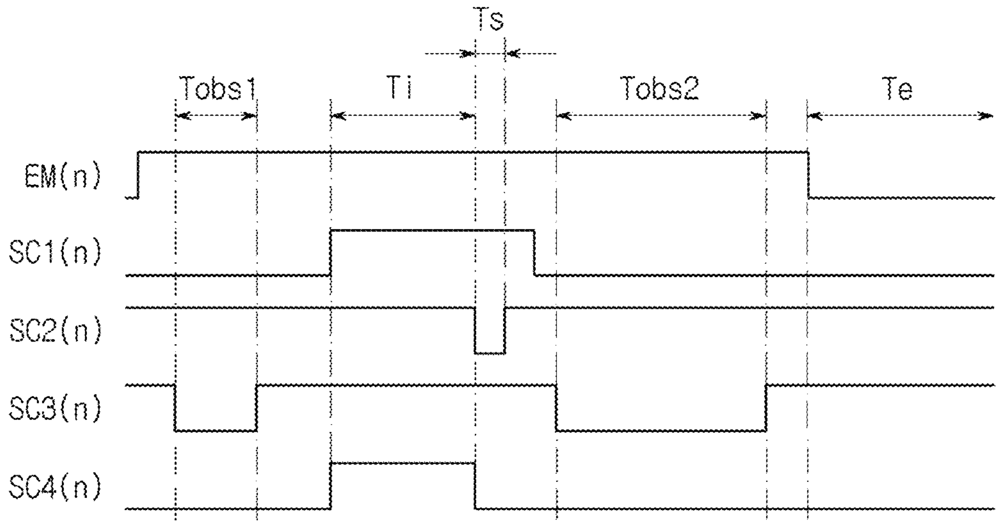
FIGS. 5A and 5B are diagrams showing driving waveforms corresponding to a refresh period and a hold period for an operation of the pixel circuit of FIG. 4 according to an exemplary embodiment of the present disclosure.
Figure 5B:
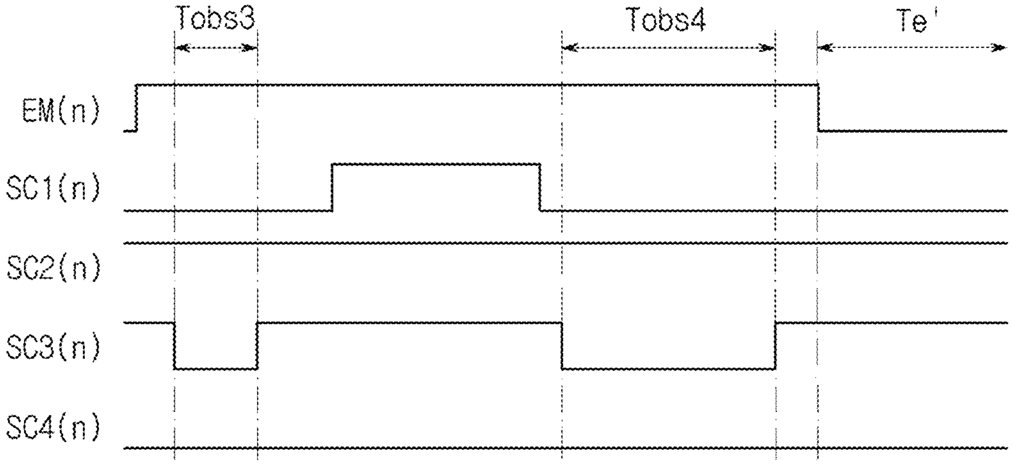

FIGS. 5A and 5B are diagrams showing driving waveforms corresponding to a refresh period and a hold period for an operation of the pixel circuit of FIG. 4.

The display apparatus according to an exemplary embodiment of the present disclosure may be a display apparatus having a variable refresh rate (VRR) mode. The VRR mode may be driven at a reference frame frequency, and then, may increase a refresh rate, by which a data voltage Vdata is updated, to be more than the reference frame frequency at a time requiring high speed driving to operate a pixel, or may lower power consumption or may decrease the refresh rate to be smaller than the reference frame frequency at a time requiring low speed driving to operate the pixel.

Each of a plurality of pixels P may be driven by a combination of a refresh frame and a hold frame for one second. In the present disclosure, one frame may be defined as a period at which a combination of a refresh period where the data voltage Vdata is updated and a hold period where the data voltage Vdata is not updated is repeated for one second.

In a case where a refresh rate is 120 Hz, only during a refresh period, a pixel circuit may be driven. That is, the refresh period may occur 120 times within one second. One refresh period may be "$1/120$=8.33 ms", and one frame period may be 8.33 ms.

In a case where a refresh rate is 60 Hz, a refresh period and a hold period may alternately occur. That is, each of the refresh period and the hold period may alternately occur 60 times within one second. A period of each of one refresh period and one hold period may be "0.5/60=8.33 ms", and one frame period may be 16.66 ms.

In a case where a refresh rate is 1 Hz, one frame may be driven based on one refresh period and 119 hold periods after one refresh period. A period of each of one refresh period and one hold period may be "$1/120$=8.33 ms", and one frame period may be 1 s.

In a refresh period, a new data voltage Vdata may be applied to a driving transistor DT through charging based on the new data voltage Vdata, and in a hold period, a data voltage Vdata of a previous frame may be maintained and used. Also, a process of applying the new data voltage Vdata to the driving transistor DT may be omitted, and thus, the hold period may be referred to as a skip period.

Each of a plurality of pixels P may initialize a voltage which is charged or remains in a pixel circuit during a refresh period. In detail, each of the plurality of pixels P may remove an adverse effect of the high level driving voltage EVDD and the data voltage Vdata stored in a previous frame in the refresh period. Accordingly, each of the plurality of pixels P may display an image corresponding to the new data voltage Vdata.

Each of the plurality of pixels P may provide the light emitting device EL with a driving current corresponding to the data voltage Vdata during the hold period, and thus, may display an image and may maintain a turn-on state of the light emitting device EL.

First, driving of a pixel circuit and a light emitting device in a refresh period of FIG. 5A will be described. The refresh period may include at least one bias periods Tobs1 and Tobs2, an initialization period Ti, a sampling period Ts, and an emission period Te and may operate based thereon, but this may be merely an embodiment and the order thereof is not limited thereto.

Referring to FIG. 5A, the pixel circuit may include at least one bias periods Tobs1 and Tobs2 and may operate during a refresh period.

The at least one bias periods Tobs1 and Tobs2 may be a period where an on bias stress operation OBS supplied with a bias voltage Vobs is performed, an emission control signal EM(n) may be a high voltage, and the third and fourth switching transistors T3 and T4 may perform an off operation. A first scan signal SC1(n) and a fourth scan signal SC4(n) may be a low voltage, and the first switching transistor T1 and the seventh switching transistor T7 may perform an off operation. A second scan signal SC2(n) may be a high voltage, and the second switching transistor T2 may perform an off operation.

A third scan signal SC3(n) may be a low voltage, and the fifth switching transistor T5 and the sixth switching transistor T6 may be turned on. As the fifth switching transistor T5 is turned on, the bias voltage Vobs may be applied to the first electrode of the driving transistor DT connected with the second node N2.

Here, the bias voltage Vobs may be supplied to the third node N3 which is the drain electrode of the driving transistor DT, and thus, a charging time or charging delay of a voltage of the fifth node N5 which is the anode electrode of the light emitting device EL may be reduced in an emission period. The driving transistor DT may maintain a stronger saturation state.

For example, as the bias voltage Vobs increases, a voltage of the third node N3 which is the drain electrode of the driving transistor DT may increase, and a gate-source voltage or a drain-source voltage of the driving transistor DT may decrease. Accordingly, the bias voltage Vobs may be at least greater than the data voltage Vdata.

At this time, a level of a drain-source current passing through the driving transistor DT may decrease, and a stress of the driving transistor DT may be reduced in a positive bias stress situation, thereby solving a charging delay of a voltage of the third node N3. In other words, by performing an on bias stress operation OBS before sampling a threshold voltage Vth of the driving transistor DT, a hysteresis of the driving transistor DT may be reduced.

Therefore, in the at least one bias periods Tobs1 and Tobs2, the on bias stress operation OBS may be defined as an operation of directly applying an appropriate bias voltage to the driving transistor DT during non-emission periods.

Moreover, in the at least one of bias periods Tobs1 and Tobs2, the sixth switching transistor T6 may be turned on, and thus, the anode electrode (or the pixel electrode) of the light emitting device EL connected with the fifth node N5 may be initialized to the first initialization voltage Var.

However, the gate electrodes of the fifth and sixth switching transistors T5 and T6 may receive a separate scan signal and may be independently controlled. That is, in the bias period, it may not be needed that the bias voltage is simultaneously applied to the first electrode of the driving transistor DT and the anode electrode of the light emitting device EL.

Referring to FIG. 5A, the pixel circuit may include an initialization period Ti and may operate during the refresh period. The initialization period Ti may be a period where a voltage at the gate electrode of the driving transistor DT is initialized.

The first to fourth scan signals SC1(n) to SC4(n) and the emission control signal EM(n) may be a high voltage, and the first switching transistor T1 and the seventh switching transistor T7 may be turned on. Also, the second to sixth switching transistors T2 to T6 may be turned off. As the first switching transistor T1 and the seventh switching transistor T7 are turned on, the gate electrode and the second electrode of the driving transistor DT connected with the first node N1 may be initialized to the second initialization voltage Vini.

Referring to FIG. 5A, the pixel circuit may include a sampling period Ts and may operate during the refresh period. The sampling period may be a period where the threshold voltage Vth of the driving transistor DT is sampled.

The first scan signal SC1(n), the third scan signal SC3(n), and the emission control signal EM(n) may be a high voltage, and the second scan signal SC2(n) and the fourth scan signal SC4(n) may be input as a low voltage. Accordingly, the third to seventh switching transistors T3 to T7 may be turned off, the first switching transistor T1 may maintain an on state, and the second switching transistor T2 may be turned on. That is, the second switching transistor T2 may be turned on, and thus, the data voltage Vdata may be applied to the driving transistor DT and the driving transistor DT may be diode-connected between the first node N1 and the third node N3 by the first switching transistor T1, thereby sampling the threshold voltage Vth of the driving transistor DT.

Referring to FIG. 5A, the pixel circuit may include an emission period Te and may operate during the refresh period. The emission period Te may be a period where the sampled threshold voltage Vth is offset and the light emitting device EL emits light with a driving current corresponding to a sampled data voltage.

The emission control signal EM(n) may be a low voltage, and the third and fourth switching transistors T3 and T4 may be turned on.

As the third switching transistor T3 is turned on, the high level driving voltage EVDD connected with the fourth node N4 may be applied to the first electrode of the driving transistor DT, connected with the second node N2, through the third switching transistor T3. A driving current, supplied to the light emitting device EL via the fourth switching transistor T4 from the driving transistor DT, may be irrelevant to a value of the threshold voltage of the driving transistor DT, and thus, the threshold voltage of the driving transistor DT may be compensated for.

Hereinafter, driving of a pixel circuit and a light emitting device in a hold period will be described with reference to FIG. 5B.

A hold period may include at least one bias periods Tobs3 and Tobs4 and an emission period Te'. A description of an operation of the pixel circuit which is the same as an operation of the refresh period is omitted or briefly given.

As described above, in the refresh period, a new data voltage Vdata may be applied to the gate electrode of the driving transistor DT through charging based on the new data voltage Vdata, but in the hold period, a data voltage Vdata of the refresh period may be maintained. Therefore, the refresh period and the hold period may have a difference therebetween. Accordingly, unlike an operation of the refresh period, an operation of the hold period may not need the initialization period Ti and the sampling period Ts.

In an operation of the hold period, it may be sufficient that the on bias stress operation OBS is performed only once. However, in the present embodiment, for convenience of a driving circuit, a third scan signal SC3(n) of the hold period may be driven to be equal to the third scan signal SC3(n) of the refresh period, and thus, like the refresh period, the on bias stress operation OBS may be performed twice.

In terms of second and fourth scan signals SC2(n) and SC4(n), a driving signal of the hold period in FIG. 5B may have a difference with the driving signal of the refresh period described above with reference to FIG. 5A. In the hold period, because the initialization period Ti and the sampling period Ts are not needed, unlike the refresh period, the second scan signal SC2(n) may be a high voltage always, and the fourth scan signal SC4(n) may be a low voltage always. That is, the second and seventh switching transistors T2 and T7 may always perform an off operation.

Figure 6:
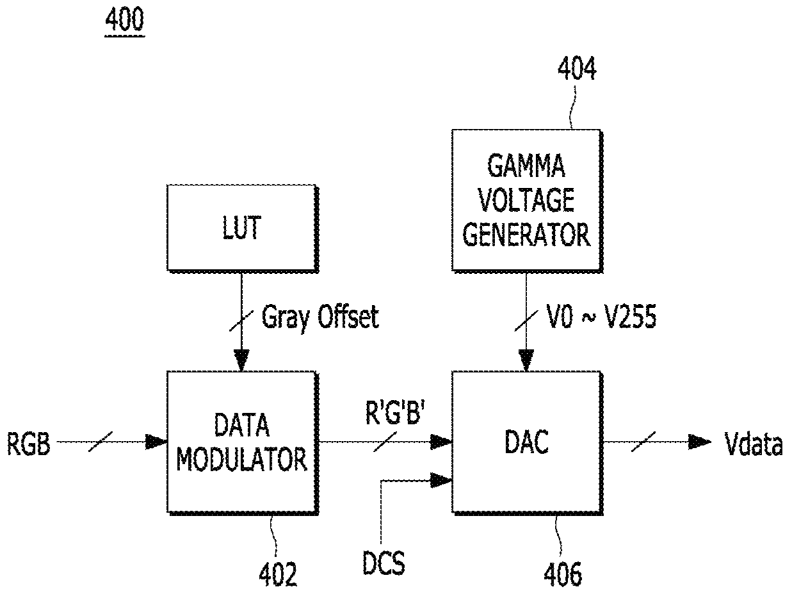
FIG. 6 is a block diagram illustrating a configuration of a data driver, in a display apparatus according to an exemplary embodiment of the present disclosure.
Figure 7:
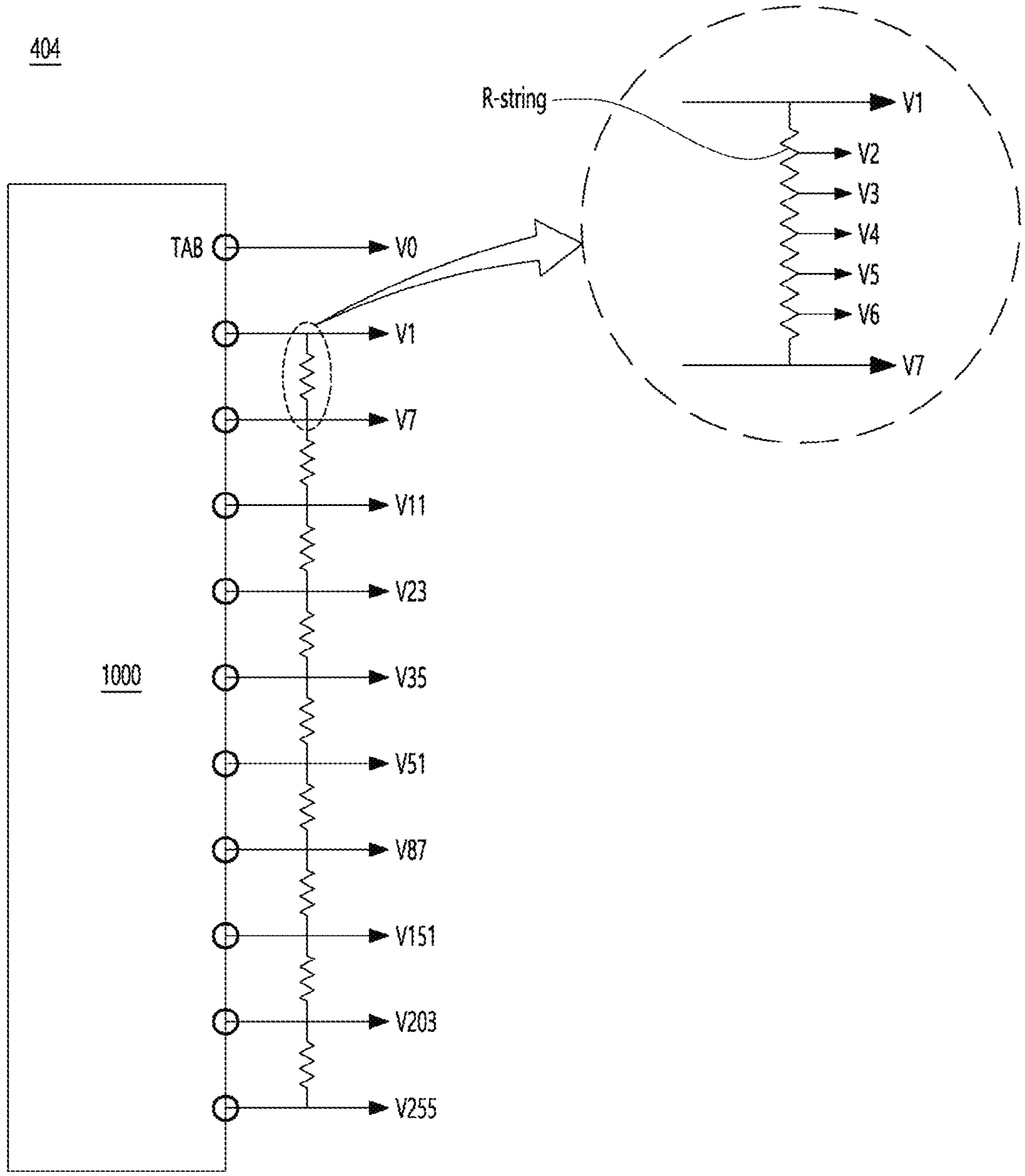
FIG. 7 is a diagram illustrating a configuration of a gamma voltage generator included in the data driver of FIG. 6 according to an exemplary embodiment of the present disclosure.

FIG. 6 is a block diagram illustrating a configuration of a data driver 400, in a display apparatus 10 according to an exemplary embodiment of the present disclosure. FIG. 7 is a diagram illustrating a configuration of a gamma voltage generator 404 included in the data driver 400 of FIG. 6 according to an exemplary embodiment of the present disclosure.

Referring to FIG. 6, the data driver 400 may convert image data RGB into a data voltage Vdata on the basis of gamma compensation voltages V0 to V255 according to a data control signal DCS supplied from the controller 200 (see FIG. 1) and may supply the data voltage Vdata to a pixel P through a data line DL. The data driver 400 may be configured with a plurality of ICs.

One IC of the data driver 400 may include a data modulator 402, a lookup table LUT, a gamma voltage generator 404, and a digital-to-analog converter (DAC) 406. In some embodiments, the data modulator 402 may be a data modulator circuit.

The lookup table LUT may store a gray offset to compensate for a gray-based luminance drop. The gray offset may be for compensating for gray-based luminance drop occurring in the gamma compensation voltages V0 to V255 and may have different levels for a plurality of gray levels.

The data modulator 402 may modulate input image data RGB into a gray offset with reference to the gray offset of the lookup table LUT. The data modulator 402 may add the gray offset having different magnitudes for a plurality of gray levels to the input image data RGB to generate modulated image data R'G'B' and may output the modulated image data R'G'B' to the DAC 406. The lookup table LUT may be disposed in the data modulator 402, or may be disposed outside the data modulator 402.

The gamma voltage generator 404 may output the gamma compensation voltages V0 to V255 including a plurality of gamma reference tap voltages. The number of gamma compensation voltages may vary based on the number of bits of each of the input image data RGB. When each of the input image data RGB applied to one pixel is implemented with 8 bits, the number of gamma compensation voltages may be 256 with respect to each of RGB. When each of the input image data RGB applied to one pixel is implemented with 9 bits or 10 bits, the number of gamma compensation voltages may be 512 or 1,024 with respect to each of RGB. In the present embodiment, for convenience, an example is described where each of the input image data RGB is implemented with 8 bits and the number of gamma compensation voltages for each of RGB is 256, such as V0 to V255.

The gamma compensation voltages V0 to V255, like FIG. 7, may include a plurality of gamma reference tap voltages V0, V1, V7, V11, V23, V35, V51, V87, V151, V203, and V255 and a plurality of interpolation voltages each disposed between two adjacent gamma reference tap voltages of gamma reference tap voltages V0, V1, V7, V11, V23, V35, V51, V87, V151, V203, and V255. For example, a plurality of interpolation voltages V2, V3, V4, V5, and V6 may be arranged between the gamma reference tap voltages V1 and V7.

The plurality of gamma reference tap voltages V0, V1, V7, V11, V23, V35, V51, V87, V151, V203, and V255 may be corrected based on a target gamma curve by using a tuning circuit 1000. The number and connection positions of gamma reference tap voltages may be variously modified. As an example, although it is illustrated that there are 11 gamma reference tap voltages, the number of the gamma reference tap voltages are not limited thereto, and may be smaller or greater than 11. As an example, an interval between the plurality of gamma reference tap voltages may be variously modified.

The plurality of interpolation voltages may be interpolated through resistor strings connected between the plurality of gamma reference taps. The plurality of interpolation voltages may be generated based on a voltage division scheme based on a resistor string.

The DAC 406 may map the modulated image data R'G'B' to the gamma compensation voltages V0 to V255 to output data voltages Vdata which is to be input pixels, based on the data control signal DCS.

Figure 8:
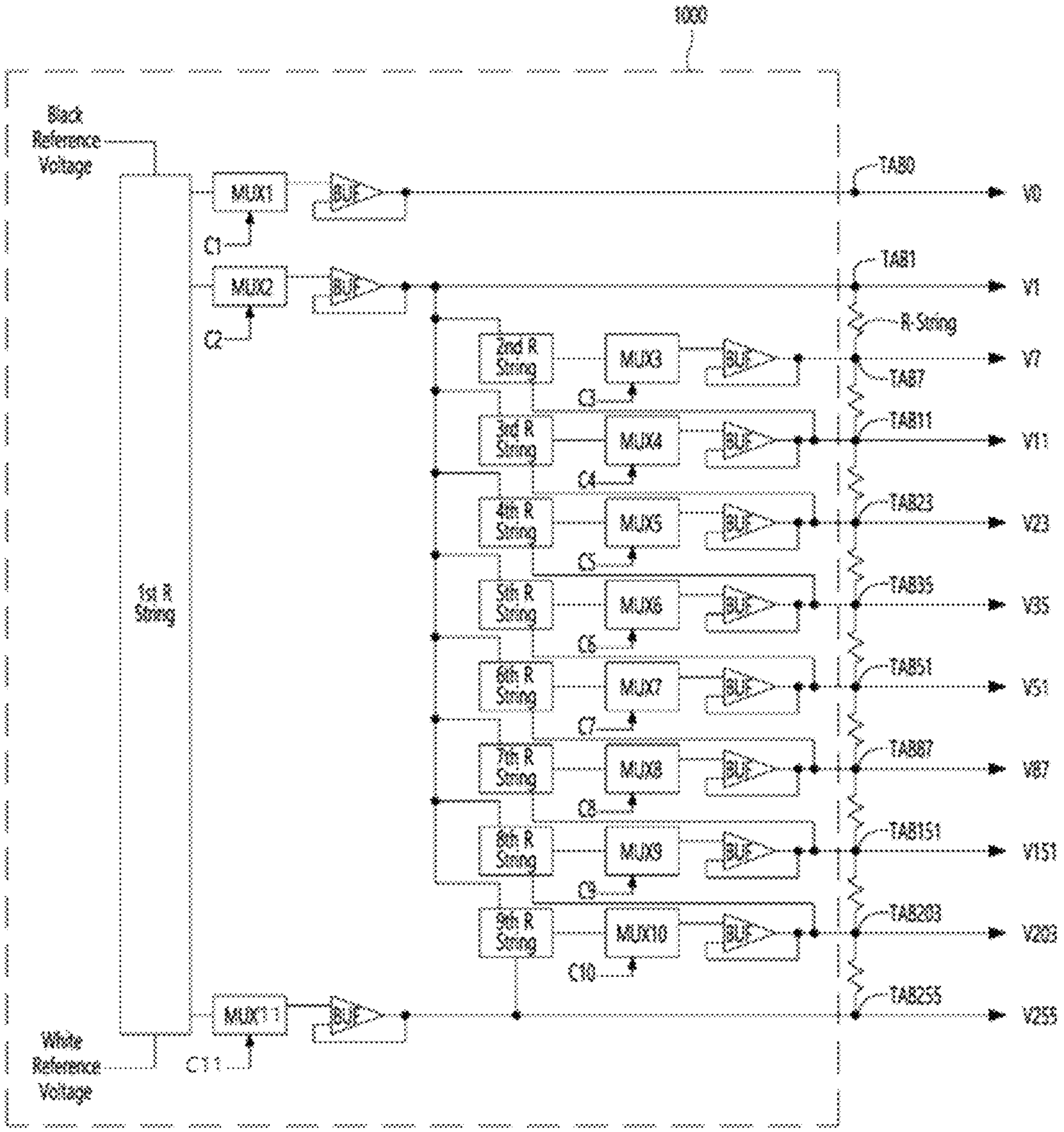
FIG. 8 is a diagram illustrating a configuration of a tuning circuit of the gamma voltage generator according to an exemplary embodiment of the present disclosure.

FIG. 8 is a diagram illustrating a configuration of the tuning circuit 1000 of the gamma voltage generator 404 according to an exemplary embodiment of the present disclosure.

Referring to FIG. 8, the tuning circuit 1000 may include first to ninth resistor strings, first to eleventh multiplexer circuits MUX1 to MUX11, and a plurality of voltage buffers BUF, so as to correct a plurality of gamma reference tap voltages V0, V1, V7, V11, V23, V35, V51, V87, V151, V203, and V255 according to a target gamma curve.

A first resistor string may be connected between an input terminal for a black reference voltage and an input terminal for a white reference voltage and may divide a difference voltage between the white reference voltage and the black reference voltage, and thus, may output a plurality of reference voltages. The reference voltages may be divided into low gray reference voltages, middle gray reference voltages, and high gray reference voltages.

A first multiplexer circuit MUX1 may select one of the low gray reference voltages as a gamma reference tap voltage V0 in response to first control data C1. A level of the gamma reference tap voltage V0 applied to TAB0 may be adjusted based on the first control data C1.

A second multiplexer circuit MUX2 may select one of the middle gray reference voltages as a gamma reference tap voltage V1 in response to second control data C2. A level of the gamma reference tap voltage V1 applied to TAB1 may be adjusted based on the second control data C2.

A second resistor string may be connected between TAB1 and TAB11 and may divide a difference voltage between a gamma reference tap voltage V11 and the gamma reference tap voltage V1 to output division voltages.

A third multiplexer circuit MUX3 may select one of division voltages of a second resistor string as a gamma reference tap voltage V7 in response to third control data C3. A level of the gamma reference tap voltage V7 applied to TAB7 may be adjusted based on the third control data C3.

A third resistor string may be connected between TAB1 and TAB23 and may divide a difference voltage between a gamma reference tap voltage V23 and the gamma reference tap voltage V1 to output division voltages.

A fourth multiplexer circuit MUX4 may select one of division voltages of a third resistor string as a gamma reference tap voltage V11 in response to fourth control data C4. A level of the gamma reference tap voltage V11 applied to TAB11 may be adjusted based on the fourth control data C4.

A fourth resistor string may be connected between TAB1 and TAB35 and may divide a difference voltage between a gamma reference tap voltage V35 and the gamma reference tap voltage V1 to output division voltages.

A fifth multiplexer circuit MUX5 may select one of division voltages of a fourth resistor string as a gamma reference tap voltage V23 in response to fifth control data C5. A level of the gamma reference tap voltage V23 applied to TAB23 may be adjusted based on the fifth control data C5.

A fifth resistor string may be connected between TAB1 and TAB51 and may divide a difference voltage between a gamma reference tap voltage V51 and the gamma reference tap voltage V1 to output division voltages.

A sixth multiplexer circuit MUX6 may select one of division voltages of a fifth resistor string as a gamma reference tap voltage V35 in response to sixth control data C6. A level of the gamma reference tap voltage V35 applied to TAB35 may be adjusted based on the sixth control data C6.

A sixth resistor string may be connected between TAB1 and TAB87 and may divide a difference voltage between a gamma reference tap voltage V87 and the gamma reference tap voltage V1 to output division voltages.

A seventh multiplexer circuit MUX7 may select one of division voltages of a sixth resistor string as a gamma reference tap voltage V51 in response to seventh control data C7. A level of the gamma reference tap voltage V51 applied to TAB51 may be adjusted based on the seventh control data C7.

A seventh resistor string may be connected between TAB1 and TAB151 and may divide a difference voltage between a gamma reference tap voltage V151 and the gamma reference tap voltage V1 to output division voltages.

An eighth multiplexer circuit MUX8 may select one of division voltages of a seventh resistor string as a gamma reference tap voltage V87 in response to eighth control data C8. A level of the gamma reference tap voltage V87 applied to TAB87 may be adjusted based on the eighth control data C8.

An eighth resistor string may be connected between TAB1 and TAB203 and may divide a difference voltage between a gamma reference tap voltage V203 and the gamma reference tap voltage V1 to output division voltages.

A ninth multiplexer circuit MUX9 may select one of division voltages of an eighth resistor string as a gamma reference tap voltage V151 in response to ninth control data C9. A level of the gamma reference tap voltage V151 applied to TAB151 may be adjusted based on the ninth control data C9.

A ninth resistor string may be connected between TAB1 and TAB255 and may divide a difference voltage between a gamma reference tap voltage V255 and the gamma reference tap voltage V1 to output division voltages.

A tenth multiplexer circuit MUX10 may select one of division voltages of a ninth resistor string as a gamma reference tap voltage V203 in response to tenth control data C10. A level of the gamma reference tap voltage V203 applied to TAB203 may be adjusted based on the tenth control data C10.

An eleventh multiplexer circuit MUX11 may select one of high gray reference voltages as a gamma reference tap voltage V255 in response to eleventh control data C11. A level of the gamma reference tap voltage V255 applied to TAB255 may be adjusted based on the eleventh control data C11.

Voltage buffers BUF may stabilize the adjusted gamma reference tap voltages V0, V1, V7, V11, V23, V35, V51, V87, V151, V203, and V255, and then, may respectively output the stabilized gamma reference tap voltages to taps corresponding thereto.

The first to eleventh control data C1 to C11 may each be implemented with a plurality of bits, for tuning margin of a wide range.

Figure 9:
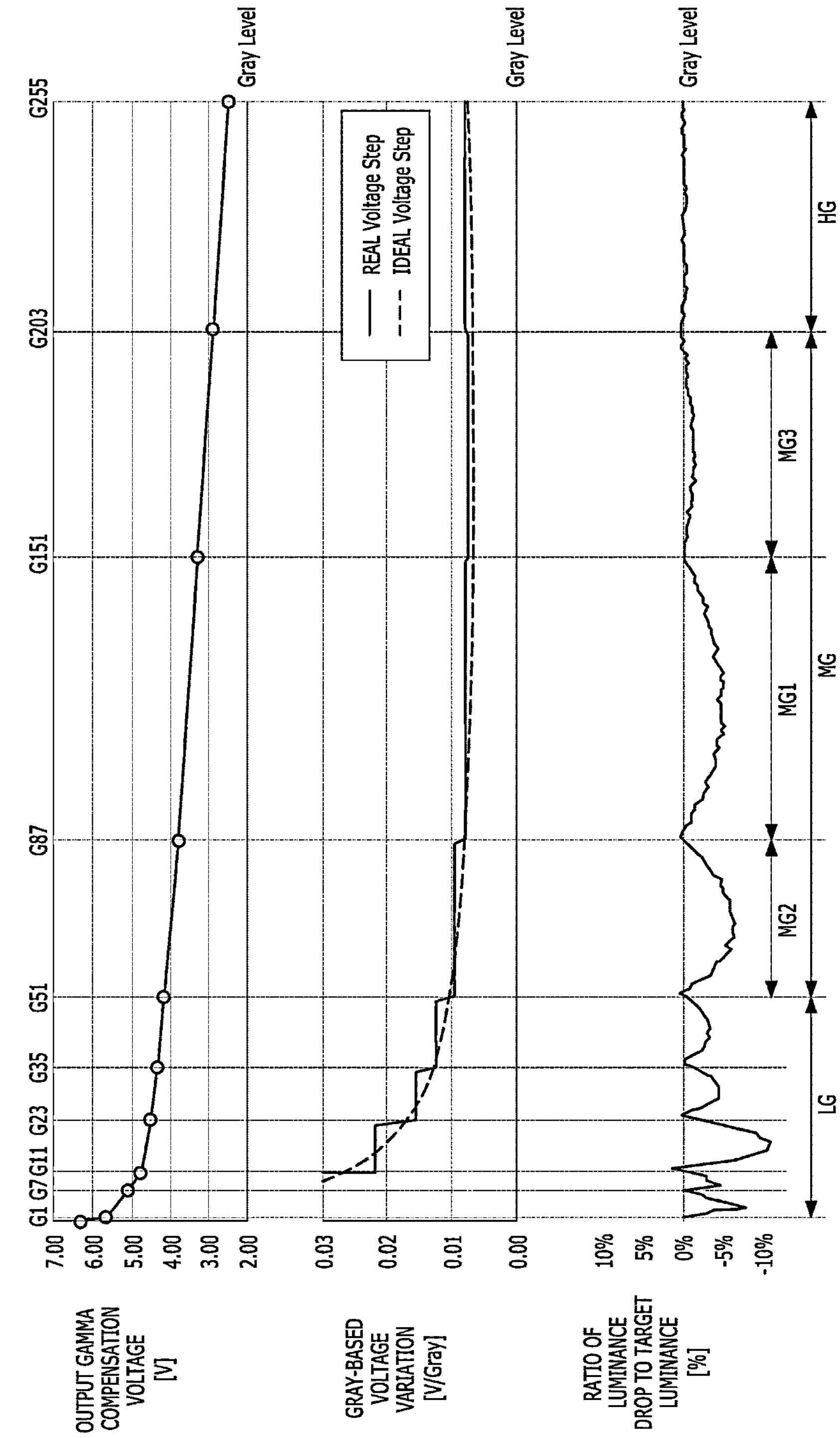
FIG. 9 is a diagram showing the amount of gray-based voltage variation and a gray-based luminance drop rate of gamma compensation voltages according to an exemplary embodiment of the present disclosure.
Figure 10:
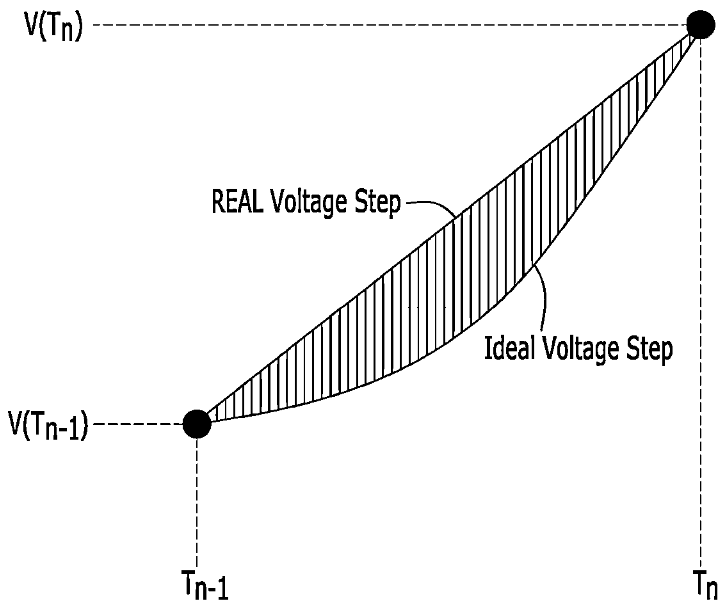
FIG. 10 is a diagram illustrating an ideal voltage step and a real voltage step corresponding to gamma compensation voltages between two adjacent gamma reference tap voltages according to an exemplary embodiment of the present disclosure.
Figure 11:
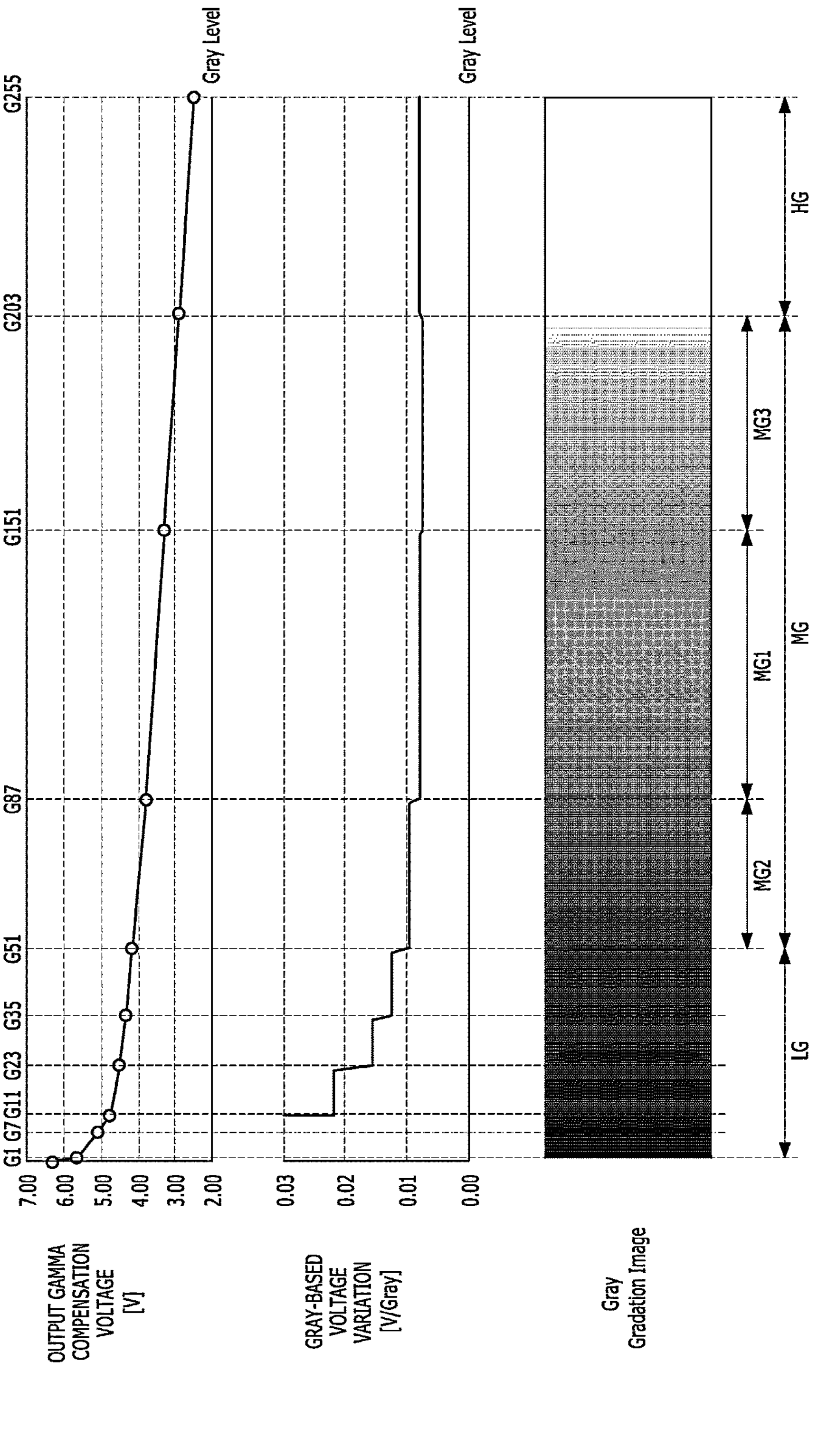
FIG. 11 is a diagram illustrating gray step differences occurring near reference gray levels due to a gray-based voltage variation of gamma compensation voltages according to an exemplary embodiment of the present disclosure.

FIG. 9 is a diagram showing the amount of gray-based voltage variation and a gray-based luminance drop rate of gamma compensation voltages according to an exemplary embodiment of the present disclosure. FIG. 10 is a diagram illustrating an ideal voltage step and a real voltage step corresponding to gamma compensation voltages between two adjacent gamma reference tap voltages according to an exemplary embodiment of the present disclosure. FIG. 11 is a diagram illustrating gray step differences occurring near reference gray levels due to a gray-based voltage variation of gamma compensation voltages according to an exemplary embodiment of the present disclosure.

Referring to FIG. 9, gamma reference tap voltages V0, V1, V7, V11, V23, V35, V51, V87, V151, V203, and V255 may respectively match reference gray levels G0, G1, G7, G11, G23, G35, G51, G87, G151, G203, and G255. A gray interval arranged between adjacent reference gray levels may be an interpolation interval. In each interpolation, interpolation voltages may be determined to have a certain (e.g., constant) voltage step dV(gray) between gray levels as in FIG. 10 and Equation 1, according to a voltage division rule based on a resistor string.

$$dV(\text{gray}) = \frac{V(T_n) - V(T_{n-1})}{T_n - T_{n-1}} \quad \text{[Equation 1]}$$

(Here, $T_{n-1} < \text{gray} < T_n$ and $T_n$, $T_{n-1}$ = Gamma reference tap)

For example, when V151 and V203 which are gamma reference tap voltages are assumed respectively to be 3.28 V and 2.89 V, a voltage step determined in an interpolation interval between reference gray levels G151 and G203 corresponding to V151 and V203 may be "(3.28-2.89)/(203-151)" and may be "0.007V/Gray". In other words, 52 interpolation voltages G152 to G202 generated in the interpolation interval may be implemented as a certain voltage step having a difference of 0.007 V per gray level.

According to such a linear interpolation scheme, as in Equation 2, a deviation between an ideal voltage step Ideal_dV(x) and a real voltage step dV(x) determined by interpolation in each interpolation interval may be accumulated, and thus, accumulated voltage drop and luminance drop based thereon may occur. Here, the ideal voltage step Ideal_dV(x) may denote the amount of gray-based voltage variation which satisfies a target gamma curve (for example, a 2.2 gamma curve).

$$\text{Accumulated Voltage Drop (gray)} = \int_{T_{n-1}}^{gray} (dV(x) - \text{Ideal\_dV}(x))dx \quad \text{[Equation 2]}$$

The amount of luminance drop may be proportional to the amount of accumulated voltage drop, and thus, the reason why luminance drop is large may be described with reference to the reason that the accumulated voltage drop is large. A magnitude of accumulated voltage drop may be proportional to a deviation between the real voltage step dV(x) and the ideal voltage step Ideal_dV(x) 1), and may be proportional to a gray range for accumulating a deviation 2).

Therefore, a magnitude of luminance drop based on linear interpolation may be largest in a middle gray interval MG, may be second largest in a low gray interval LG including grays lower than the middle gray interval MG, and may be less in a high gray interval HG including grays higher than the middle gray interval MG.

Moreover, the magnitude of the luminance drop based on the linear interpolation may be largest in a first middle gray interval MG1, may be second largest in a second middle gray interval MG2, and may be third largest in a third middle gray interval MG3. The second middle gray interval MG2 may be a gray interval between the low gray interval LG and the first middle gray interval MG1. The third middle gray interval MG3 may be a gray interval between the first middle gray interval MG1 and the high gray interval HG.

For example, the low gray interval LG may be a gray interval of G0 to G51, the second middle gray interval MG2 may be a gray interval of G51 to G87, the first middle gray interval MG1 may be a gray interval of G87 to G151, the third middle gray interval MG3 may be a gray interval of G151 to G203, and the high gray interval HG may be a gray interval of G203 to G255, but embodiments of the present disclosure are not limited thereto.

Due to the linear interpolation described above, as in FIG. 11, the amount of gray-based voltage variation may be rapidly changed before and after the reference gray levels G0, G1, G7, G11, G23, G35, G51, G87, G151, G203, and G255, and thus, a gray step difference may be recognized near the reference gray levels G0, G1, G7, G11, G23, G35, G51, G87, G151, G203, and G255. The gray step difference may denote a phenomenon where luminance is not reversed in a gradation image where gray levels are continuously arranged, but a discontinuous step difference is recognized like there being the discontinuous step difference.

Figure 12:
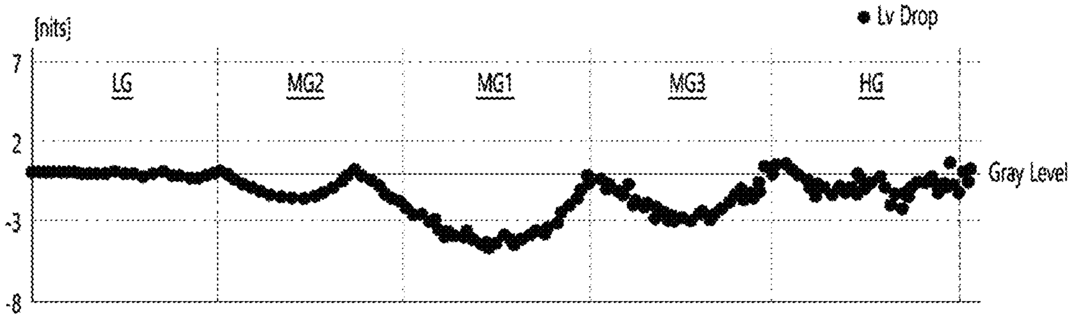
FIG. 12 is a diagram illustrating a luminance drop rate between gray levels according to an exemplary embodiment of the present disclosure.
Figure 13:
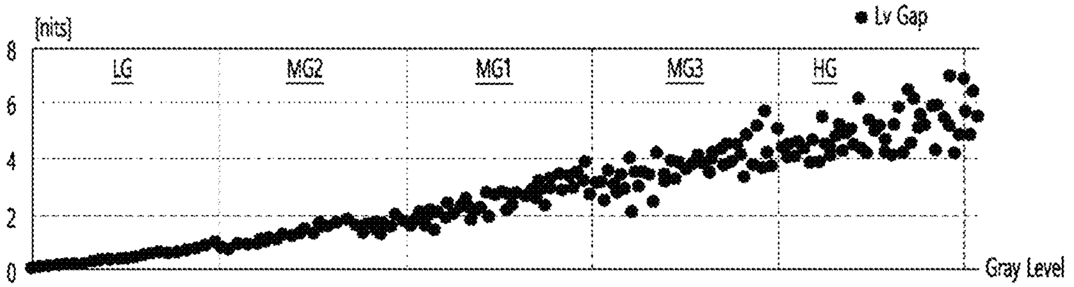
FIG. 13 is a diagram illustrating a luminance gap rate between gray levels according to an exemplary embodiment of the present disclosure.
Figure 14:
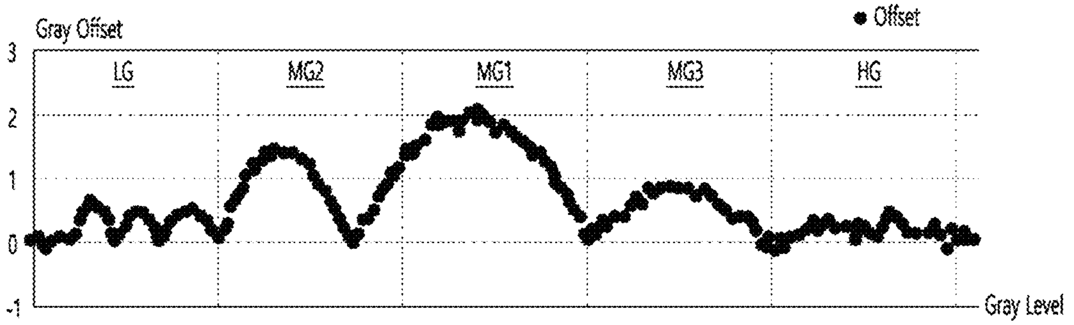
FIG. 14 is a diagram illustrating a magnitude of a gray offset determined based on a luminance drop rate and a luminance gap rate between gray levels according to an exemplary embodiment of the present disclosure.

FIG. 12 is a diagram illustrating a luminance drop rate between gray levels according to an exemplary embodiment of the present disclosure. FIG. 13 is a diagram illustrating a luminance gap rate between gray levels according to an exemplary embodiment of the present disclosure. FIG. 14 is a diagram illustrating a magnitude of a gray offset determined based on a luminance drop rate and a luminance gap rate between gray levels according to an exemplary embodiment of the present disclosure.

A problem, where luminance drop occurs because the gamma compensation voltages described above are generated by a linear interpolation scheme, may be compensated for based on the gray offset.

A magnitude of the gray offset may be defined as Equation 3.

$$\text{Offset (gray)} = \frac{LvDrop(\text{gray})}{LvGap(\text{gray})} = -\frac{LvMeasure(\text{gray}) - LvIdeal(\text{gray})}{LvMeasure(\text{gray}+1) - LvMeasure(\text{gray})} \quad \text{[Equation 3]}$$

In Equation 3, "Lv_Drop(gray)" may be the amount of luminance drop of each gray level and may be defined as a deviation between a real voltage step Lv_Measure(gray) and an ideal voltage step Lv_Ideal(gray). Also, "Lv_Gap(gray)" may be defined as a luminance gap "Lv_Measure(gray+1)−Lv_Measure(gray)" between each gray level and a gray level adjacent thereto in a predetermined target gamma curve.

Referring to Equation 3, a magnitude of a gray offset may be proportional to the amount of luminance drop of each gray level Lv_Drop(gray) and may be inversely proportional to a luminance gap between each gray level and a gray level adjacent thereto. The amount of luminance drop of each gray level Lv_Drop(gray) may be determined based on an interval between gamma reference taps, and thus, the magnitude of the gray offset may be set to be proportional to the interval between the gamma reference taps.

For example, as in FIG. 12, the amount of luminance drop of each gray level LvDrop(gray) may be the order of MG1>MG3>MG2>HG>LG. Also, a luminance gap LvGap (gray) between adjacent gray levels in the target gamma curve may increase toward a high gray level from a low gray level. The magnitude of the gray offset may be determined to be proportional to the amount of luminance drop LvDrop (gray) and inversely proportional to the luminance gap LvGap(gray), and thus, as in FIG. 14, may be largest in a middle gray interval MG, may be second largest in a low gray interval LG which is lower than the middle gray interval MG, and may be less in a high gray interval HG which is higher than the middle gray interval MG.

Moreover, the magnitude of the gray offset may be largest in a first middle gray interval MG1, may be second largest in a second middle gray interval MG2, and may be third largest in a third middle gray interval MG3. As an example, an amount of gray-based voltage variation of the gamma compensation voltages may be compensated for in a parabola shape in at least one the gray intervals (e.g., in each of the gray intervals), based on the gray offset, as illustrated in FIG. 14.

Figure 15A:
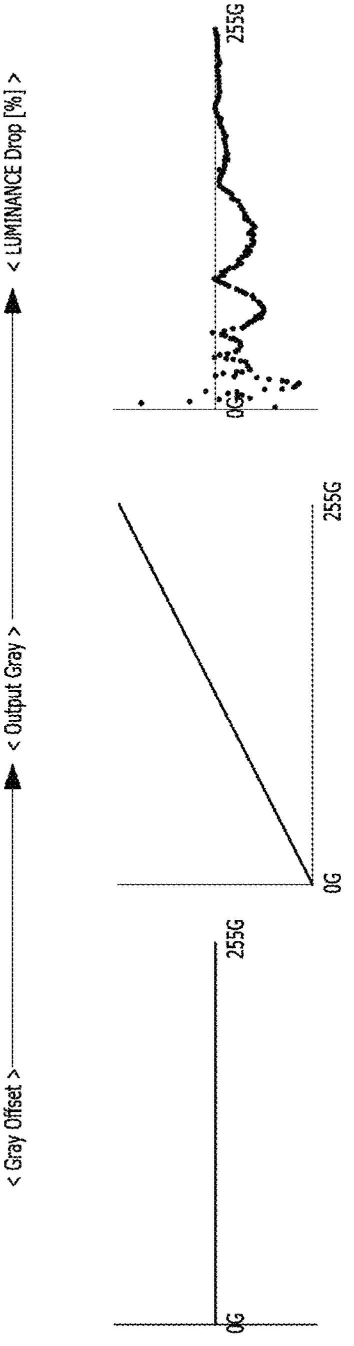
FIGS. 15A and 15B are diagrams illustrating examples of compensating an output gray rate and a luminance drop rate by differentially applying a gray offset according to an exemplary embodiment of the present disclosure.
Figure 15B:
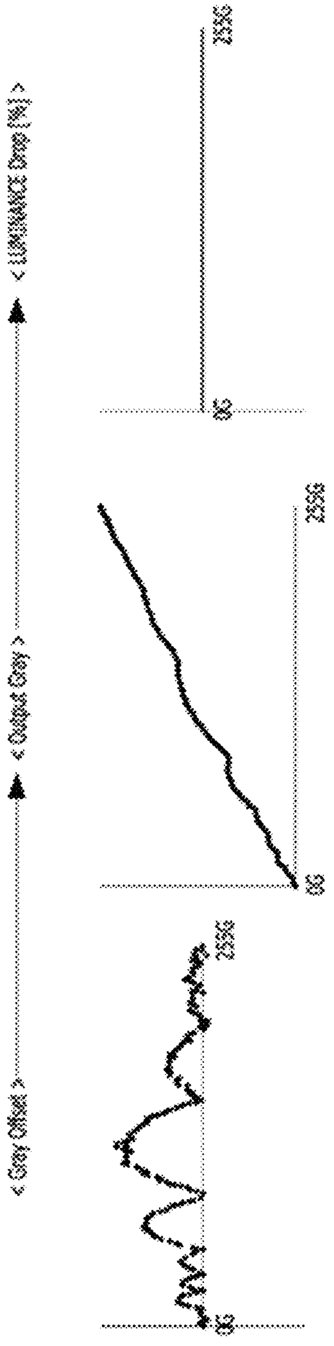

FIGS. 15A and 15B are diagrams illustrating examples of compensating an output gray rate and a luminance drop rate by differentially applying a gray offset.

Referring to FIG. 15A, in a case where the data modulator 402 (see FIG. 6) generates modulated image data R'G'B' on the basis of a gray offset having the same magnitude for different gray levels, an output gray graph of the modulated image data R'G'B' may represent a linear increase form, and thus, a problem of luminance drop based on linear interpolation in the data modulator 402 (see FIG. 6) may not be solved.

On the other hand, referring to FIG. 15B, in a case where the data modulator 402 (see FIG. 6) generates the modulated image data R'G'B' on the basis of a gray offset having different magnitudes for a plurality of gray levels, the output gray graph of the modulated image data R'G'B' may be modulated into a nonlinear increase form. The output gray graph of the modulated image data R'G'B' may be largest modulated in the middle gray interval MG, may be second largest modulated in the low gray interval LG, and may be less modulated in the high gray interval HG which is higher than the middle gray interval MG. As a result, the problem of the luminance drop based on the linear interpolation in the data modulator 402 (see FIG. 6) may be solved.

The present embodiment may realize the following effects.

According to the present embodiment, a data modulator which is a digital circuit block may compensate for luminance drop on the basis of a gray offset to decrease a gray step difference, thereby enhancing display quality.

According to the present embodiment, the data modulator which is the digital circuit block may compensate for luminance drop on the basis of the gray offset to enhance the accuracy of output luminance, and thus, may effectively solve a gray step difference which is a side effect of a gamma voltage generator which is an analog circuit block.

The effects according to the present disclosure are not limited to the above examples, and other various effects may be included in the specification.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. A display apparatus comprising:

a display panel including a plurality of pixels;

a data modulator circuit configured to modulate input image data with reference to a gray offset to output modulated image data;

a gamma voltage generator configured to output gamma compensation voltages, the gamma compensation voltages including a plurality of gamma reference tap voltages; and a digital-to-analog converter configured to:

map the modulated image data to the gamma compensation voltages, and output data voltages based on the mapping, the output data voltages input to the plurality of pixels, wherein the gray offset has different magnitudes for a plurality of gray levels.

2. The display apparatus of claim 1, wherein a magnitude of the gray offset is proportional to a gray interval between gamma reference taps, through which the plurality of gamma reference tap voltages are output respectively, and the magnitude of the gray offset is inversely proportional to a luminance gap between adjacent gray levels in a predetermined target gamma curve.

3. The display apparatus of claim 1, wherein a magnitude of the gray offset is largest in a middle gray interval, is second largest in a low gray interval including grays lower than the middle gray interval, and is less in a high gray interval including grays higher than the middle gray interval.

4. The display apparatus of claim 3, wherein the middle gray interval comprises a first middle gray interval, a second middle gray interval between the low gray interval and the first middle gray interval, and a third middle gray interval between the first middle gray interval and the high gray interval, and the magnitude of the gray offset is largest in the first middle gray interval, is second largest in the second middle gray interval, and is third largest in the third middle gray interval.

5. The display apparatus of claim 1, wherein an amount of gray-based voltage variation of the gamma compensation voltages changed in a step shape by using the plurality of gamma reference tap voltages as inflection points is compensated for in at least one of gray intervals between gamma reference taps, through which the plurality of gamma reference tap voltages are output respectively, based on the gray offset.

6. The display apparatus of claim 5, wherein the amount of gray-based voltage variation of the gamma compensation voltages is compensated for in a parabola shape in at least one of gray intervals, based on the gray offset.

7. The display apparatus of claim 1, wherein a ratio of gray-based luminance drop to target luminance is compensated in at least one of gray intervals between gamma reference taps, through which the plurality of gamma reference tap voltages are output respectively, based on the gray offset.

8. The display apparatus of claim 1, further comprising: a lookup table configured to store the gray offset.

9. The display apparatus of claim 1, wherein the data modulator circuit is configured to add the gray offset to the input image data to output the modulated image data.

10. The display apparatus of claim 1, wherein the modulated image data has a nonlinear increase form.

11. The display apparatus of claim 1, wherein the gray offset has different magnitudes for different gray intervals between gamma reference taps, through which the plurality of gamma reference tap voltages are output respectively.

12. The display apparatus of claim 11, wherein interpolation voltages in each gray interval among the gamma compensation voltages have a constant voltage step between gray levels.

13. A driving method of a display apparatus including a display panel, the display panel including a plurality of pixels, the driving method comprising:

modulating input image data with reference to a gray offset to output modulated image data;

outputting gamma compensation voltages including a plurality of gamma reference tap voltages;

mapping the modulated image data to the gamma compensation voltages; and outputting data voltages based on the mapping, the outputted data voltages input to the plurality of pixels, wherein the gray offset has different magnitudes for a plurality of gray levels.

14. The driving method of claim 13, wherein a magnitude of the gray offset is proportional to a gray interval between gamma reference taps, through which the plurality of gamma reference tap voltages are output respectively, and the magnitude of the gray offset is inversely proportional to a luminance gap between adjacent gray levels in a predetermined target gamma curve.

15. The driving method of claim 13, wherein a magnitude of the gray offset is largest in a middle gray interval, is second largest in a low gray interval including grays lower than the middle gray interval, and is less in a high gray interval including grays higher than the middle gray interval.

16. The driving method of claim 15, wherein the middle gray interval comprises a first middle gray interval, a second middle gray interval between the low gray interval and the first middle gray interval, and a third middle gray interval between the first middle gray interval and the high gray interval, and the magnitude of the gray offset is largest in the first middle gray interval, is second largest in the second middle gray interval, and is third largest in the third middle gray interval.

17. The driving method of claim 13, wherein an amount of gray-based voltage variation of the gamma compensation voltages changed in a step shape by using the plurality of gamma reference tap voltages as inflection points are compensated for in at least one of gray intervals between gamma reference taps, through which the plurality of gamma reference tap voltages are output respectively, based on the gray offset.

18. The driving method of claim 13, wherein a ratio of gray-based luminance drop to target luminance is compensated in at least one of gray intervals between gamma reference taps, through which the plurality of gamma reference tap voltages are output respectively, based on the gray offset.

* * * * *